(12) United States Patent
Akutsu et al.

(10) Patent No.: US 9,311,013 B2
(45) Date of Patent: Apr. 12, 2016

(54) STORAGE SYSTEM AND STORAGE AREA ALLOCATION METHOD HAVING AN AUTOMATIC TIER LOCATION FUNCTION

(75) Inventors: Hiroaki Akutsu, Yokohama (JP); Yoshinori Ohira, Yokohama (JP); Yoshiaki Eguchi, Yokohama (JP); Masayuki Yamamoto, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 198 days.

(21) Appl. No.: 13/125,467

(22) PCT Filed: Mar. 25, 2011

(86) PCT No.: PCT/JP2011/001775
§ 371 (c)(1),
(2), (4) Date: Apr. 21, 2011

(87) PCT Pub. No.: WO2012/131749
PCT Pub. Date: Oct. 4, 2012

(65) Prior Publication Data
US 2012/0246386 A1 Sep. 27, 2012

(51) Int. Cl.
*G06F 3/06* (2006.01)
(52) U.S. Cl.
CPC .............. *G06F 3/0649* (2013.01); *G06F 3/061* (2013.01); *G06F 3/0685* (2013.01)
(58) Field of Classification Search
None
See application file for complete search history.

(56) References Cited

U.S. PATENT DOCUMENTS

| 6,480,930 B1 * | 11/2002 | Zakai ...................... | G06F 3/061 711/105 |
| 2002/0071193 A1 * | 6/2002 | Ogawa ................... | G11B 5/012 360/31 |

(Continued)

FOREIGN PATENT DOCUMENTS

| JP | 2006-302010 A | 11/2006 | |
| WO | 2011/029713 A1 | 3/2011 | |
| WO | WO-2011/029713 A1 * | 3/2011 | ............... G06F 3/06 |

OTHER PUBLICATIONS

Azusa Sudo et al., "A Study of Virtual Storage Tiering Function", 2011 Information Processing Society of Japan, Mar. 2, 2011, p. 1-31-1-32, 3 pages.

(Continued)

Primary Examiner — Edward Dudek, Jr.
Assistant Examiner — Matthew Chrzanowski
(74) Attorney, Agent, or Firm — Volpe and Koenig, P.C.

(57) ABSTRACT

If a monitor measurement cycle is set as a long cycle, promotion in a short cycle cannot be performed; and even if the number of I/Os is very large in response to fluctuations of the number of I/Os in several minutes to several hours of normal work, pages will be promoted after waiting for several weeks. As a result, I/Os which could have normally accepted by an upper tier will be accepted by a lower tier, which results in a problem of worsening the performance efficiency. A monitoring system capable of preventing demotion due to temporary reduction of the number of I/Os for specific pages from a viewpoint of a long cycle and enabling prompt promotion in response to an increase of the number of U/Os for 3 the specific pages is realized.
A load index value defined from a viewpoint of a long cycle and a load index value defined from a viewpoint of a short cycle are updated based on the number of I/Os which is counted cyclically for each storage area. Promotion and demotion are implemented based on a value(s) calculated from these load index values.

11 Claims, 19 Drawing Sheets

(56) References Cited

U.S. PATENT DOCUMENTS

| | | | | |
|---|---|---|---|---|
| 2003/0140207 A1* | 7/2003 | Nagase | G06F 3/061 | 711/167 |
| 2006/0047999 A1* | 3/2006 | Passerini | G06F 11/1458 | 714/6.12 |
| 2007/0277005 A1* | 11/2007 | So | G06F 12/0891 | 711/154 |
| 2008/0209104 A1* | 8/2008 | Tanaka | G06F 3/0605 | 711/100 |
| 2009/0300283 A1* | 12/2009 | Kudo | G06F 3/061 | 711/114 |
| 2010/0191922 A1* | 7/2010 | Dickey | G06F 3/061 | 711/154 |
| 2011/0047322 A1* | 2/2011 | Allen | G11C 16/349 | 711/103 |
| 2011/0283062 A1* | 11/2011 | Kumagai | G06F 3/0608 | 711/114 |
| 2012/0042124 A1* | 2/2012 | Miyamoto | G06F 3/0605 | 711/114 |
| 2014/0019701 A1* | 1/2014 | Ohira | G06F 3/0613 | 711/165 |

OTHER PUBLICATIONS

Shugo Ogawa et al., "An Improvement of Cache Usage Estimation with TLB Information", Information Processing Society of Japan, vol. 2007, No. 79, IPSJ SIG Technical Reports, Aug. 1, 2007, vol. 2007, No. 79, p. 25-30.

* cited by examiner

118 LOCAL MEMORY
- 401 HOST I/O PROCESSING PROGRAM
- 402 FREQUENCY DISTRIBUTION CREATION PROCESSING PROGRAM
- 403 WEIGHTED AVERAGE CALCULATION PROCESSING PROGRAM
- 404 DESTAGING PROCESSING PROGRAM
- 405 PAGE RELOCATION PROCESSING PROGRAM

| POOL NUMBER (506) | VIRTUAL VOLUME NUMBER (501) | LOGICAL ADDRESS (502) | POOL VOLUME NUMBER (503) | LOGICAL ADDRESS (504) | MONITOR INFORMATION INDEX NUMBER (505) |
|---|---|---|---|---|---|
| 1 | 1 | 0x0000 | 204 | 0x0040 | 1 |
| 1 | 1 | 0x0010 | 201 | 0x0050 | 2 |
| 1 | 2 | 0x0000 | 203 | 0x0020 | 3 |
| 1 | 2 | 0x0030 | 202 | 0x0040 | 4 |
| 1 | 2 | 0x0020 | 201 | 0x0010 | 5 |

| POOL VOLUME NUMBER (601) | PHYSICAL DRIVE NUMBER (602) | PHYSICAL START ADDRESS (603) |
|---|---|---|
| 201 | 1003 | 0x0000 |
| 202 | 1001 | 0x0000 |
| 203 | 1001 | 0x1000 |
| 204 | 1002 | 0x0000 |

| MONITOR INFORMATION INDEX NUMBER (701) | I/O COUNTER (A-SIDE) (702A) | I/O COUNTER (B-SIDE) (702B) | WEIGHTED AVERAGE CALCULATION COUNTER 1 (703A) | WEIGHTED AVERAGE CALCULATION COUNTER 2 (703B) |
|---|---|---|---|---|
| 1 | 1000 | 2000 | 200 | 123 |
| 2 | 613 | 12124 | 5321 | 1412 |
| 3 | 232 | 123 | 321 | 1233 |
| 4 | 35 | 32 | 332 | 2323 |
| 5 | 2 | 325 | 532 | 2312 |

| POOL NUMBER | NUMBER OF I/OS | NUMBER OF PAGES |
|---|---|---|
| 1 | 0 | 1190 |
|   | 10 | 123 |
|   | 100 | 14 |
|   | 1000 | 4 |
|   | 10000 | 2 |
| 2 | 0 | 1190 |
|   | 10 | 123 |
|   | 100 | 14 |
|   | 1000 | 4 |
|   | 10000 | 2 |

306

| VIRTUAL VOLUME NUMBER | NUMBER OF I/OS | NUMBER OF PAGES |
|---|---|---|
| 1 | 0 | 1190 |
|   | 10 | 123 |
|   | 100 | 14 |
|   | 1000 | 4 |
|   | 10000 | 2 |
| 2 | 0 | 1190 |
|   | 10 | 123 |
|   | 100 | 14 |
|   | 1000 | 4 |
|   | 10000 | 2 |

| POOL NUMBER | WEIGHTED AVERAGE CALCULATION COUNTER NUMBER | TYPE | VALUE |
|---|---|---|---|
| 1 | 1 (short-range) | WEIGHTED VALUE OF WEIGHTED AVERAGE CALCULATION COUNTER | 63 |
| | | WEIGHTED VALUE OF I/O COUNTER | 1 |
| | | WEIGHTED VALUE IN COMBINED TOTAL | 1 |
| | 2 (long-range) | WEIGHTED VALUE OF WEIGHTED AVERAGE CALCULATION COUNTER | 7 |
| | | WEIGHTED VALUE OF I/O COUNTER | 1 |
| | | WEIGHTED VALUE IN COMBINED TOTAL | 1 |
| | — | NUMBER OF COUNTERS | 2 |
| | | COMBINED TOTAL CALCULATION METHOD | AVG |
| 2 | 1 (short-range) | WEIGHTED VALUE OF WEIGHTED AVERAGE CALCULATION COUNTER | 31 |
| | | WEIGHTED VALUE OF I/O COUNTER | 1 |
| | | WEIGHTED VALUE IN COMBINED TOTAL | 1 |
| | 2 (long-range) | WEIGHTED VALUE OF WEIGHTED AVERAGE CALCULATION COUNTER | 3 |
| | | WEIGHTED VALUE OF I/O COUNTER | 1 |
| | | WEIGHTED VALUE IN COMBINED TOTAL | 1 |
| | — | NUMBER OF COUNTERS | 2 |
| | | COMBINED TOTAL CALCULATION METHOD | MAX |

FIG.10

| VIRTUAL VOLUME NUMBER | WEIGHTED AVERAGE CALCULATION COUNTER NUMBER | TYPE | VALUE |
|---|---|---|---|
| 1 | 1 (short-range) | WEIGHTED VALUE OF WEIGHTED AVERAGE CALCULATION COUNTER | 63 |
| | | WEIGHTED VALUE OF I/O COUNTER | 1 |
| | | WEIGHTED VALUE IN COMBINED TOTAL | 1 |
| | 2 (long-range) | WEIGHTED VALUE OF WEIGHTED AVERAGE CALCULATION COUNTER | 7 |
| | | WEIGHTED VALUE OF I/O COUNTER | 1 |
| | | WEIGHTED VALUE IN COMBINED TOTAL | 1 |
| | — | NUMBER OF COUNTERS | 2 |
| | | COMBINED TOTAL CALCULATION METHOD | AVG |
| 2 | 1 (short-range) | WEIGHTED VALUE OF WEIGHTED AVERAGE CALCULATION COUNTER | 31 |
| | | WEIGHTED VALUE OF I/O COUNTER | 1 |
| | | WEIGHTED VALUE IN COMBINED TOTAL | 1 |
| | 2 (long-range) | WEIGHTED VALUE OF WEIGHTED AVERAGE CALCULATION COUNTER | 3 |
| | | WEIGHTED VALUE OF I/O COUNTER | 1 |
| | | WEIGHTED VALUE IN COMBINED TOTAL | 1 |
| | — | NUMBER OF COUNTERS | 2 |
| | | COMBINED TOTAL CALCULATION METHOD | MAX |

| VIRTUAL VOLUME NUMBER 1101 | LOGICAL ADDRESS AREA 1102 | WEIGHTED AVERAGE CALCULATION COUNTER NUMBER 1103 | TYPE 1104 | VALUE 1105 |
|---|---|---|---|---|
| 1 | 0x0000 ~ 0x0FFF | 1 (short-range) | WEIGHTED VALUE OF WEIGHTED AVERAGE CALCULATION COUNTER | 63 |
| | | | WEIGHTED VALUE OF I/O COUNTER | 1 |
| | | | WEIGHTED VALUE IN COMBINED TOTAL | 1 |
| | | 2 (long-range) | WEIGHTED VALUE OF WEIGHTED AVERAGE CALCULATION COUNTER | 7 |
| | | | WEIGHTED VALUE OF I/O COUNTER | 1 |
| | | | WEIGHTED VALUE IN COMBINED TOTAL | 1 |
| | | — | NUMBER OF COUNTERS | 2 |
| | | | COMBINED TOTAL CALCULATION METHOD | AVG |
| | 0x1000 ~ 0x3FFF | 1 (short-range) | WEIGHTED VALUE OF WEIGHTED AVERAGE CALCULATION COUNTER | 31 |
| | | | WEIGHTED VALUE OF I/O COUNTER | 1 |
| | | | WEIGHTED VALUE IN COMBINED TOTAL | 1 |
| | | 2 (long-range) | WEIGHTED VALUE OF WEIGHTED AVERAGE CALCULATION COUNTER | 3 |
| | | | WEIGHTED VALUE OF I/O COUNTER | 1 |
| | | | WEIGHTED VALUE IN COMBINED TOTAL | 1 |
| | | — | NUMBER OF COUNTERS | 2 |
| | | | COMBINED TOTAL CALCULATION METHOD | MAX |

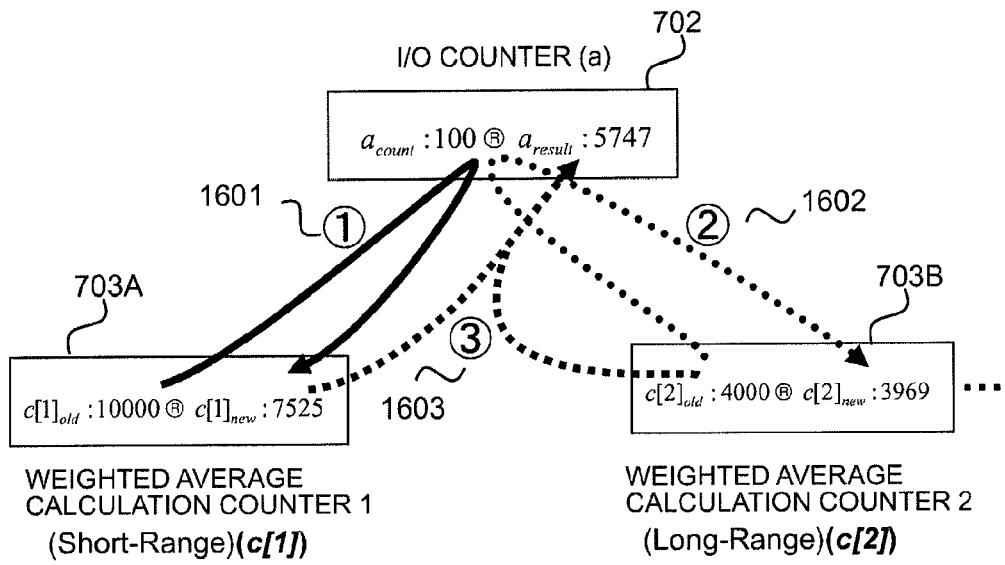

I/O COUNTER (a) 702
$a_{count}: 100 \circledR a_{result}: 5747$

1601 ①
703A
$c[1]_{old}: 10000 \circledR c[1]_{new}: 7525$ 1603
WEIGHTED AVERAGE
CALCULATION COUNTER 1
(Short-Range)(*c[1]*)

② 1602
703B
$c[2]_{old}: 4000 \circledR c[2]_{new}: 3969$
WEIGHTED AVERAGE
CALCULATION COUNTER 2
(Long-Range)(*c[2]*)

①: WEIGHTED AVERAGE
CALCULATION COUNTER 1
CALCULATE (SHORT - RANGE) VALUE  1604

$$c[1]_{new} \leftarrow \frac{(c[1]_{old} \times p[1]_1) + (a_{count} \times p[1]_2)}{(p[1]_1 + p[1]_2)}$$

②: WEIGHTED AVERAGE
CALCULATION COUNTER 2
CALCULATE (SHORT - RANGE) VALUE  1605

$$c[2]_{new} \leftarrow \frac{(c[2]_{old} \times p[2]_1) + (a_{count} \times p[2]_2)}{(p[2]_1 + p[2]_2)}$$

WEIGHTED INDEX 1607
$\begin{cases} p[1]_1 = 3 \\ p[1]_2 = 1 \\ p[2]_1 = 127 \\ p[2]_2 = 1 \end{cases}$
⋮

③: CALCULATE I/O
COUNTER VALUE  1606

WEIGHTED VALUE IN COMBINED TOTAL 1608
$\begin{cases} p[1]_{merge} = 1 \\ p[2]_{merge} = 1 \end{cases}$
⋮

$a_{result} \leftarrow Average(p[1]_{merge} \times c[1]_{new}, p[2]_{merge} \times c[2]_{new}, ...)$
or $Max(p[1]_{merge} \times c[1]_{new}, p[2]_{merge} \times c[2]_{new}, ...)$

FIG.20

PAGE SETTINGS — VOL #0, ADDRESSES 0x0000~0x0300 — 2001, 2002

■ MONITOR MODE: [WEIGHTED MODE ▼] — 2003

2008

(1) DETAILED SETTINGS:
COMBINED TOTAL CALCULATION METHOD: [AVERAGE ▼] — 2004
NUMBER OF COUNTERS: [2] — 2005

| # | OLD | NEW | COMBINED TOTAL |
|---|-----|-----|----------------|
| 1 | 3   | 1   | 1              |
| 2 | 127 | 1   | 1              |

— 2006

(2) SIMPLIFIED SETTINGS:
PRESET SELECTION: [preset1 ▼] — 2007

FIG. 21
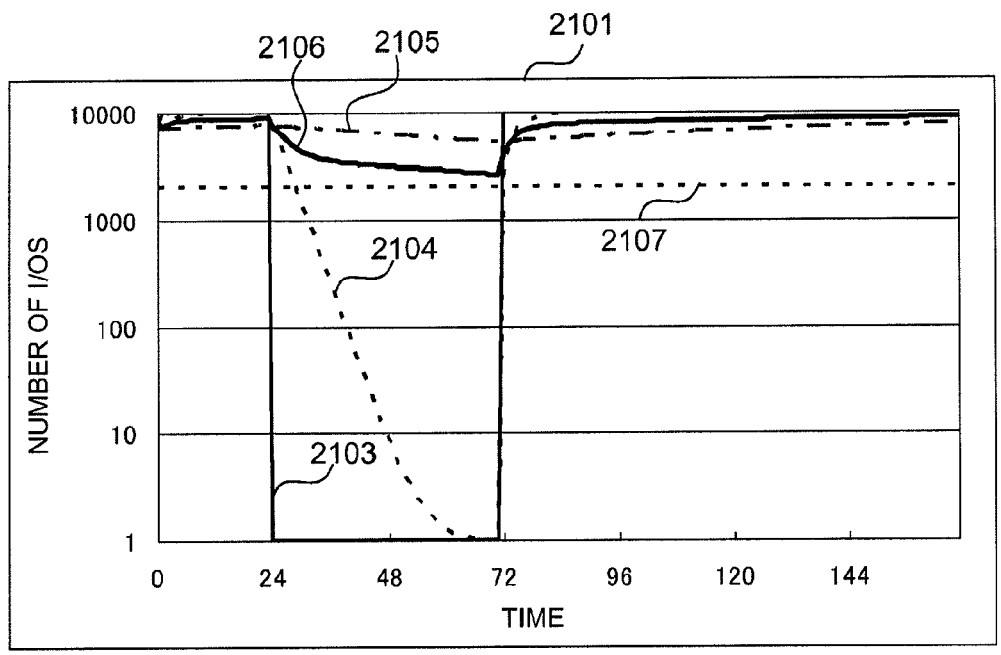
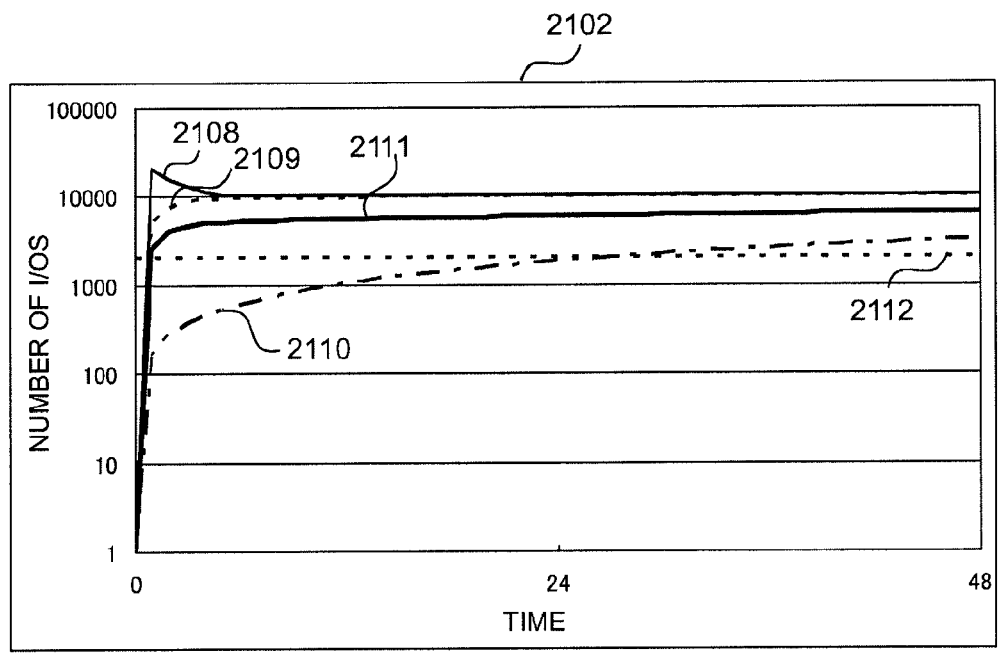

STORAGE SYSTEM AND STORAGE AREA ALLOCATION METHOD HAVING AN AUTOMATIC TIER LOCATION FUNCTION

TECHNICAL FIELD

The present invention relates to a storage system and storage area allocation method. Particularly, the invention relates to a storage system and storage area allocation method for enhancing efficiency of small-area-based (page-based) tier location in volumes by means of an automatic tier location function of a storage system having a plurality of tiers.

BACKGROUND ART

A conventional automatic tier management function technique (Patent Literature 1 and Patent Literature 2) is to: migrate pages to an upper tier when frequency of I/O to/from the pages in a certain cycle (measurement cycle) is high (hereinafter referred to as "promotion"); and migrate pages to a lower tier when the frequency of I/O frequency to/from the pages is low (hereinafter referred to as "demotion").

Batch jobs operating, for example, on week days (from Monday to Friday) and not operating on weekends (Saturday and Sunday) are considered with regard to the above-described technique. If a monitor measurement cycle is shortened (to several hours) and if the number of I/Os decreases on weekends, target pages of the batch jobs are demoted. Then, the phenomenon of performance degradation occurs every Monday when the number of I/Os increases again. In order to avoid demotion for the above-described phenomenon, the conventional technology increases the monitor measurement cycle to several weeks and measures the frequency of the number of I/Os during the long cycle, thereby smoothing the number of I/Os and avoiding the demotion on weekends.

CITATION LIST

Patent Literature

PTL 1: Specification of U.S. Patent Application Unexamined Publication No. 2009/00705412
PTL 2: Specification of U.S. Pat. No. 7,613,945
PTL 3: Specification of U.S. Pat. No. 7,228,380

SUMMARY OF INVENTION

Technical Problem

However, if a long cycle is set as the monitor measurement cycle in the conventional technology, promotion in a short cycle cannot be performed; and even if the number of I/Os is very large in response to fluctuations of the number of I/Os in several minutes to several hours of normal work, pages will be promoted after waiting for several weeks. As a result, I/Os for several weeks which could have normally accepted by an upper tier will be accepted by a lower tier, which results in a problem of worsening the performance efficiency.

The present invention was devised in consideration of the above-described circumstances and aims to suggesting a storage system and storage area allocation method capable of preventing demotion due to temporary reduction of the number of I/Os for specific pages from a viewpoint of a long cycle and enabling prompt promotion with respect to an increase of the number of I/Os for the specific pages.

Solution to Problem

In order to solve the above-described problem, a storage system including a plurality of kinds of storage media, a memory, and a processor according to the present invention is provided, wherein the processor allocates a virtual storage area to a storage area of one storage medium from among the plurality of kinds of storage media; cyclically records the number of accesses to the allocated storage area in the memory; updates a first load index value based on a first weighted average of the recorded number of accesses and the first load index value; updates a second load index value based on a second weighted average to which weight of a ratio different from that of the first weighted average is set, of the recorded number of accesses and the second load index value; and reallocates the virtual storage area to a storage area of a different kind of storage medium from among the plurality of kinds of storage media based on a third load index value, which is an average value or a maximum value of the updated first load index value and the updated second load index value.

According to the above-described configuration, a load index value defined from a viewpoint of a long cycle and a load index value defined from a viewpoint of a short cycle are updated with the number of I/Os counted cyclically for each storage area. Promotion and demotion can be implemented based on a value(s) calculated from these load index values.

Advantageous Effects of Invention

According to the present invention, prompt promotion can be implemented in response to an increase of the number of I/Os, while preventing demotion due to temporary reduction of the number of I/Os from a viewpoint of a long cycle; and many I/Os can be processed by high-speed drives in an upper tier; and bottlenecks in a lower tier can be solved, thereby enhancing the performance of the storage system.

BRIEF DESCRIPTION OF DRAWINGS

FIG. 6 is a diagram showing the configuration of a logical physical address conversion table 308.
FIG. 7 is a diagram showing the configuration of a per-page monitoring table 302.
FIG. 8 is a diagram showing the configurations of a pool frequency distribution table 306 and a virtual volume frequency distribution table 305.
FIG. 9 is a diagram showing the configuration of a pool weighted index table 303.
FIG. 10 is a diagram showing the configuration of a virtual volume weighted index table 307.
FIG. 11 is a diagram showing the configuration of a page weighted index table 304.

FIG. 16 is a diagram showing an example of calculation formulas for a weighted average calculation counter 1 (703A) value, a weighted average calculation counter 2 (703B) value, and an I/O counter value 702.

FIG. 20 is a diagram showing an example of a screen for making settings of, for example, a monitor mode, a combined total calculation method, and the number of counters, when executing page-based page relocation processing.

FIG. 21 is a diagram showing time changes of various types of the numbers of I/Os calculated according to the present invention.

DESCRIPTION OF EMBODIMENTS

Embodiments of the present invention will be explained with reference to the attached drawings. Incidentally, the embodiments described below do not limit the invention within the range of claims and all combinations of features described in the embodiments are not necessarily indispensable for the means for solving the problems according to the invention.

Figure 1:
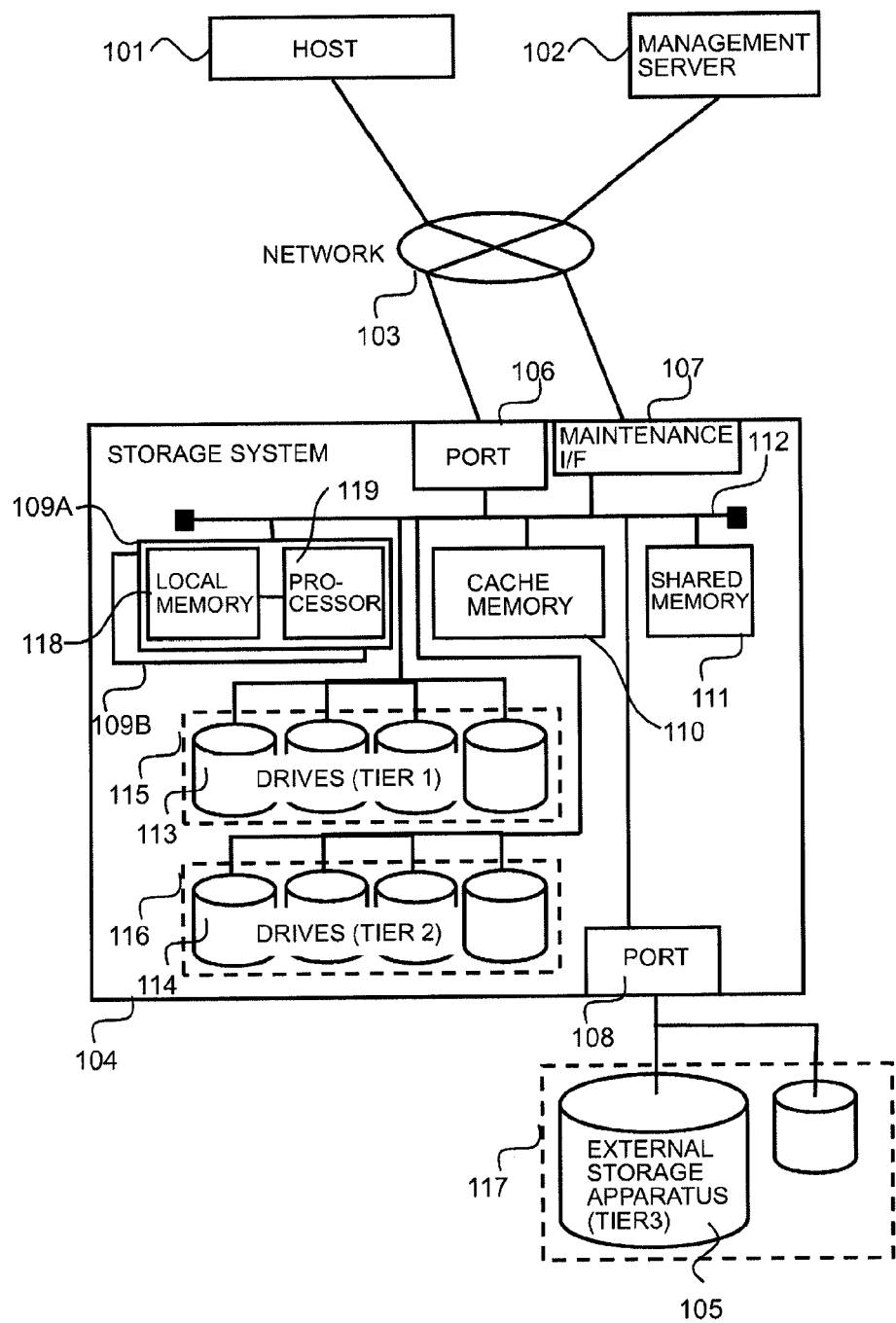
FIG. 1 is a diagram showing a configuration example for a computer system according to a first embodiment of the present invention.

FIG. 1 is a diagram showing a configuration example for a computer system according to a first embodiment of the present invention.

A host 101 is composed of, for example, a general server and is connected via a network 103 to a port 106 of a storage system 104. The host 101 issues a data read/write command to the storage system 104 and the storage system 104 reads or writes data in response to that command. The network 103 is composed of, for example, a SAN (Storage Area Network) or Ethernet. Furthermore, a management server 102 is connected via the network 103 to a maintenance I/F 107 or a port 108 of the storage system 104. A storage administrator sends, to the storage system 104, various settings and commands for management which are necessary to operate the storage system, using the management server 102. An external storage apparatus 105 is connected to the port 108 of the storage system 104. When connecting this external storage apparatus 105, the external storage apparatus 105 may be connected via the network 103 to the port 108 of the storage system 104. The external storage apparatus 105 can be treated in the same manner as a volume in the storage system. Since a specific method for treating the external storage apparatus as mentioned above is described in Patent Literature 3, its detailed explanation has been omitted.

Next, an internal configuration of the storage system 104 will be explained. The port 106, the maintenance I/F 107, processor packages 109, a cache memory 110, a shared memory 111, the port 108, drives 113, and drives 114 are connected via an internal network within the storage system 104. The cache memory 110 is a memory capable of high-speed access for storing data as temporary cache in order to enhance the throughput and responses of I/O processing of the storage system 104. The processor package 109 is constituted from a local memory 118 and a processor 119. The processor 119 executes, for example, data transfer processing between the drives 115, 116, the external storage apparatus 105, and the cache memory 110 in order to process read/write commands from the host 101. The shared memory 111 is a memory for storing necessary control information in order for the processors 119 to process read/write commands and execute storage functions (such as a volume copy function) and is a memory for storing information shared by the processors 119 between the plurality of processor packages 109A, B. The local memory 118 is a memory for storing necessary control information in order for the processors 119 to process read/write commands and execute storage functions and is an area exclusively owned and used by the processors 119. The local memory 118 stores, for example, programs executed by the processors 119. The drives 113, 114 are composed of, for example, hard disk drives having interfaces such as FC (Fibre Channel), SAS (Serial Attached SCSI), and SATA (Serial Advanced Technology Attachment), as well as SSDs (Solid State Drives).

The above-mentioned various kinds of drives have different performance. For example, the SSDs have higher I/O throughput performance than that of the hard disk drives. The storage system 104 is composed of the aforementioned plurality of kinds of drives. These plurality of kinds of drives which are classified as those having close performance are tiers 115, 116, 117. The relationship between the tiers is defined by a hierarchical relationship of performance. Since the details of these tiers are described in Patent Literature 2, its detailed explanation has been omitted.

Figure 2:
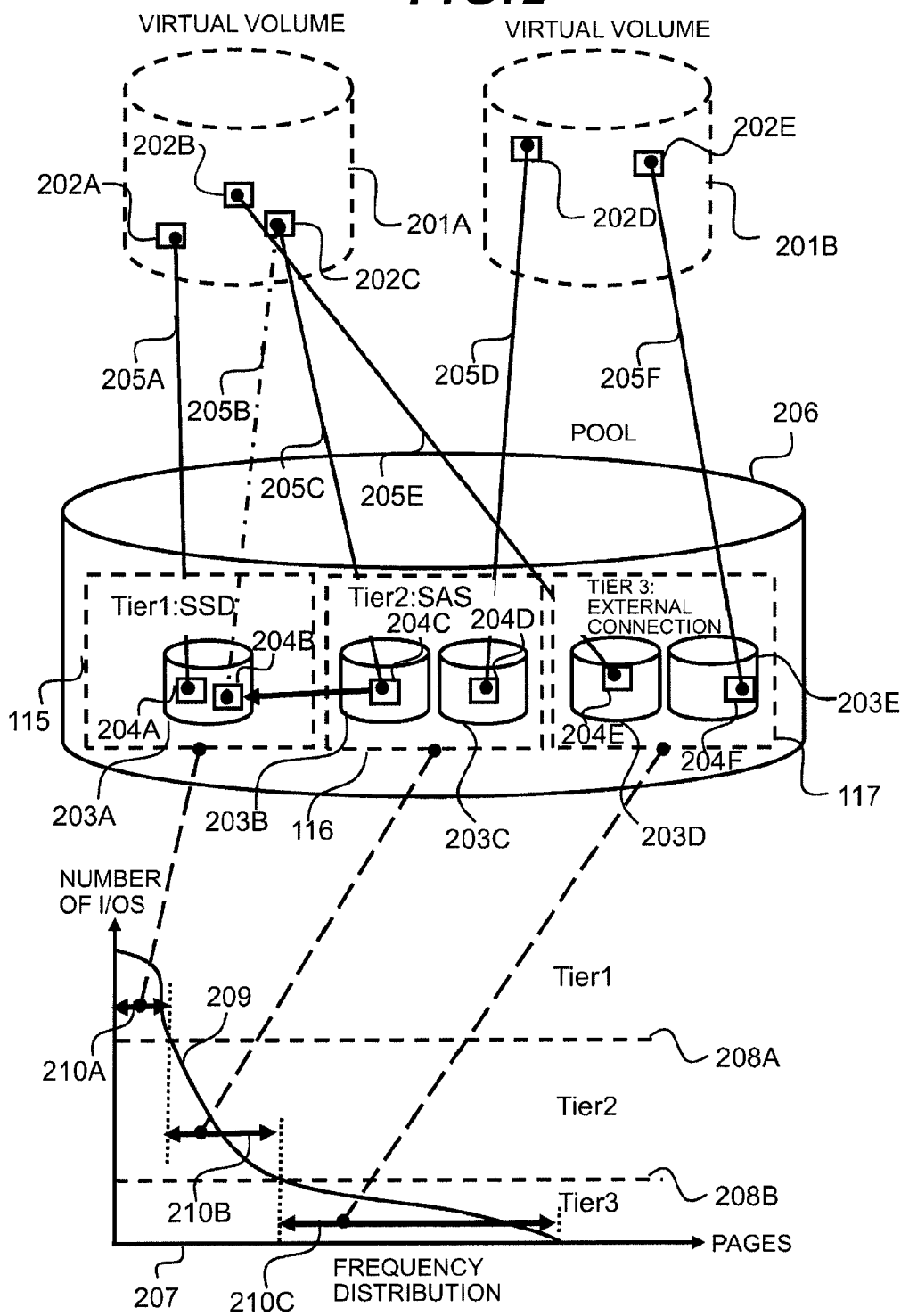
FIG. 2 is a diagram showing a logical configuration of a storage system according to the first embodiment.

FIG. 2 is a diagram showing a logical configuration of a storage system according to the first embodiment of the present invention. Virtual volumes 201 are logical storage areas recognized by the host 101 and are volumes which become targets when the host 101 issues a read or write command. A pool 206 is composed of one or more pool volumes 203. Pool volumes 204 are composed of the drives 113, 114, and the external storage apparatus 105. Specifically speaking, logical pool volumes 204 are configured by managing the correspondence relationship between logical addresses of the pool volumes 204 and physical addresses of the drives 113, 114 and the external storage apparatus 105. The details will be explained later.

The storage administrator can create a plurality of virtual volumes 201 in a pool 206 in accordance with a command from the management server 102.

The storage system 104 allocates an actual storage area to the virtual volume 201 with respect to a storage area for which the host 101 has issued a write command. Specifically speaking, when the host 101 issues a write command to a page 202A of the virtual volume 201 for the first time, the storage system 104 associates the page 202A with an area of an unused pool volume 203 (205A); and the storage system 104 executes I/O processing on the corresponding pool volume 203 area in response to also the next read/write command to the same page from the host 101, so that the processing can be executed as if the host 101 were executing the I/O processing on virtual volumes. Limited storage capacity can be used efficiently by allocating only part of the pool volume 203 area to be used, using the virtual volumes 201 as described above.

The pool 206 has a plurality of tiers 115, 116, 117 and the pool volumes 203 are classified according to the tiers 115, 116, 117. In this embodiment, there are three tiers: an SSD tier 115 (corresponding to a pool volume 203A), an SAS tier 116 (corresponding to pool volumes 203B, 203C), and an external connection tier 117 (corresponding to pool volumes 203D, 203E).

Pages 202 of each virtual volume generally have characteristics based on I/O processing executed in response to read/write commands from the host. For example, in general, pages with high I/O frequency and pages with low I/O frequency exist in many cases (this is called access locality). In this case, the performance of the entire system can sometimes be enhanced by locating the pages with high I/O frequency in an upper tier.

For example, in a case where the SSD tier (115), which can process 100 IOPS, and the SAS tier (116) which can process 10 IOPS exist, and if a page 202C having 50 IOPS characteristics and a page 203A having 20 IOPS characteristics exist and the page 202C is currently allocated to the SAS, the SAS tier can exhibit only the performance of 10 IOPS at maximum and, therefore, the storage system 104 can exhibit only the performance of 10+20=30 IOPS as a whole (this state is called a neck state). If the page 202C can be promoted from the currently allocated SAS to the SSD tier, the storage system 104 can exhibit the performance of 50+20=70 IOPS as a whole. It is understood that in some cases the performance of the entire system can be enhanced by locating the pages with high I/O frequency in an upper tier (which is called allocation to the tier) as described above.

Specifically speaking, the above-described promotion is executed by copying data of a page 204C to an unused page 204B and changing association between the page 202C in a virtual volume 201A and the page 204C in a pool volume 203B (205C) to association between the page 202C in the virtual volume 201A and the page 204B in a pool volume 203A (205B). Demotion can be also executed similarly. Since the details are described in Patent Literature 2 (U.S. Pat. No. 7,613,945), its detailed description has been omitted.

Frequency distribution 207 shows distribution of the number of I/Os for each page. A graph 209 is a line indicating the number of I/Os for each page when pages are placed in descending order of the number of I/Os. In other words, pages with a large number of I/Os are on the left side and pages with a small number of I/Os are on the right side. Tier allocation thresholds 208 are thresholds for deciding which page having how many number of I/Os should be allocated to which tier. So, the performance of the entire system can be sometimes enhanced by locating pages with high I/O frequency in an upper tier as mentioned above, pages are sequentially allocated in the descending order of the number of I/Os to the tiers, starting from an upper tier.

For example, pages belonging to a range 210A extending from an intersection of a tier allocation threshold 208A and the frequency distribution graph 209 to include pages of the highest performance are allocated to the SSD tier 115. Pages belonging to a range 210B from an intersection of the tier allocation threshold 208A and the frequency distribution graph 209 to an intersection of a tier allocation threshold 208B and the frequency distribution graph 209 are allocated to the SAS tier 116. Pages belonging to a range extending from an intersection of the tier allocation threshold 208B and the frequency distribution graph 209 to include pages of the minimum number of I/Os are allocated to the external storage apparatus tier 117. In this way, the pages can be sequentially allocated in the descending order of the number of I/Os to the tiers, starting from the upper tier.

The tier allocation thresholds 208 may be designated by the storage administrator or calculated by the storage system 104.

The details (such as a creation method) of the frequency distribution 207 will be explained later, so the detailed explanation is omitted here.

Figure 3:
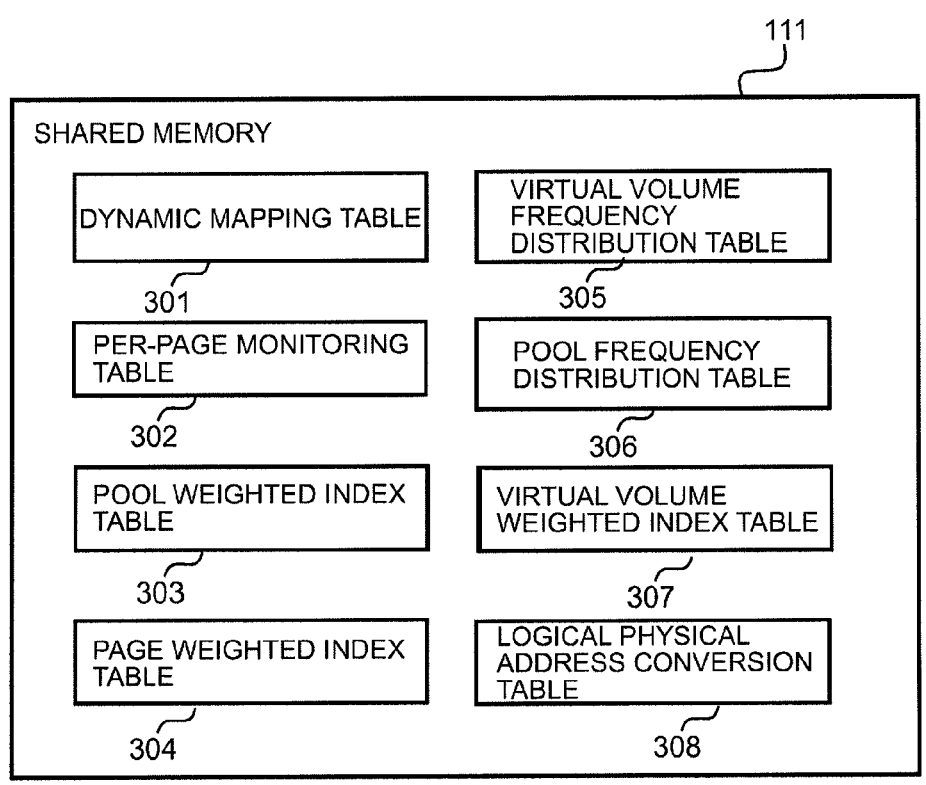
FIG. 3 is a diagram showing the types of tables located in a shared memory 111.

FIG. 3 shows the types of tables located in the shared memory 111. The detailed structure of each table will be explained later. Incidentally, this specification describes only the minimum necessary tables and other tables may exist in the shared memory.

A dynamic mapping table 301 is a table for managing the correspondence relationship between each page of virtual volumes, pool volume areas, and monitor information. A logical physical address conversion table 308 is a table for managing the correspondence relationship between pool volumes and addresses of physical disks for storing data of the pool volumes. A per-page monitoring table 302 is a table for managing monitor information of each page including the number of I/Os. A virtual volume frequency distribution table 305 is a table for managing distribution of the number of pages for each range of the number of I/Os with respect to virtual volumes. A pool frequency distribution table 306 is a table for managing distribution of the number of pages for each range of the number of I/Os with respect to pools. A pool weighted index table 303 is a table for managing various parameters used for calculation of calculation counters for each pool. A virtual volume weighted index table 307 is a table for managing various parameters used for calculation of calculation counters for each virtual volume. A page weighted index table 304 is a table for managing various parameters used for calculation of the calculation counter for each page.

Furthermore, the per-page monitoring table 302, the pool frequency distribution table 306, and the virtual volume weighted index table 307 are located in the shared memory 111 in this embodiment, but data may be located in the host 101 or the management server 102.

Figures 4, 5:
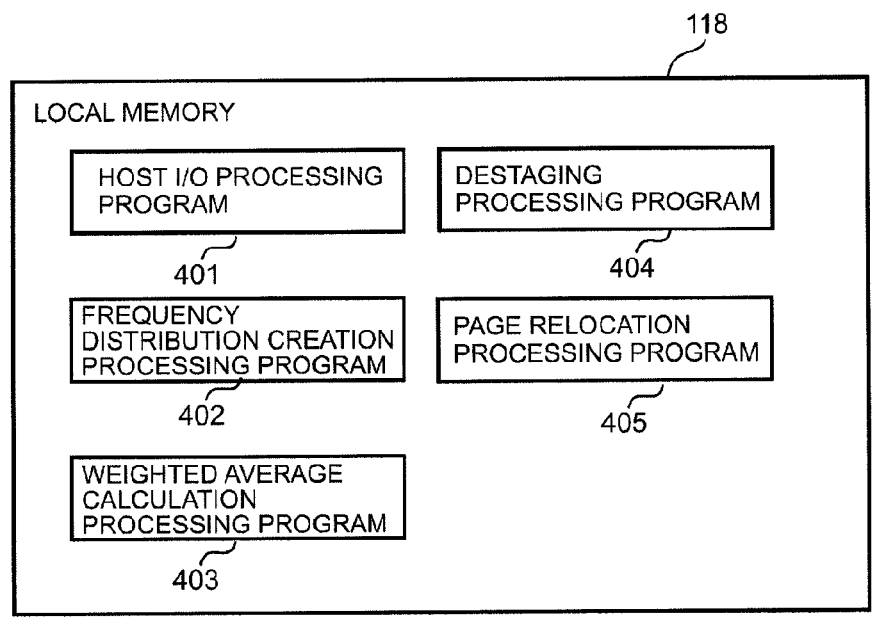
FIG. 4 is a diagram showing the types of programs located in a local memory 118.
FIG. 5 is a diagram showing the configuration of a dynamic mapping table 301.

FIG. 4 shows the types of programs located in the local memory 118. A detailed flow of each program will be explained later. Incidentally, these programs may be located in each local memory 118 or in the shared memory 111. Furthermore, this specification describes only the minimum necessary programs, but other programs may exist in the local memory.

A host I/O processing program 401 is a program for processing read/write requests received from the host with respect to virtual volumes. A destaging processing program 404 is a program for storing data, which is in the cache memory and has not been written/migrated to physical disks, in physical disks. A frequency distribution creation processing program 402 creates frequency distribution based on the collected number of I/Os for each page and calculating the tier allocation thresholds. A weighted average calculation processing program 403 is a program to be used, as one of its intended purposes, during a frequency distribution creation processing program and is a program for calculating the number of I/Os for pages based on various calculation counters. A page relocation processing program 405 is a program for relocating pages to an appropriate tier based on the number of I/Os for each page and the tier allocation thresholds.

Operation timing of the above-described programs will be explained. The host I/O processing program 401 operates when receiving host I/Os. The destaging processing program 404 cyclically operates separately from the host I/Os. The frequency distribution creation processing program 402 operates cyclically, for example, every hour. This cycle may be set by users. Monitor information collected during this cycle is a target of the frequency distribution creation processing program 402. The frequency distribution creation processing program 402 operates the weighted average calculation processing program 403 during the process of its operation. After the operation of the frequency distribution creation processing program 402 terminates, the processor 109 activates the page relocation processing program 405. The frequency distribution creation processing program 402, the weighted average calculation processing program 403, and the page relocation processing program 405 operate cyclically as described above.

If the per-page monitoring table 302, the pool frequency distribution table 306, and the virtual volume weighted index table 307 are located in the host 101 or the management server 102, the frequency distribution creation processing program 402 operates in the host 101 or the management server 102.

FIG. 5 shows the structure of the dynamic mapping table 301. One entry of the dynamic mapping table shows the correspondence relationship between a pool 206, a virtual volume 202, each page of the virtual volume 202, an area of the pool volume 204, and the monitor information of the relevant page. When managing the correspondence relationship, each page of a virtual volume is identified with a virtual volume number 501 and a logical start address 502 of the relevant page in the relevant virtual volume. Also, each area of a pool volume is identified with a pool volume number 503 and a logical start address 504 of the relevant area of the pool volume. On the other hand, the monitor information is identified with a monitor information index number 505. The monitor information index number corresponds to a monitor information index number 701 in the per-page monitoring table 302. Any of the above may be identified by other identification methods.

Moreover, the dynamic mapping table 301 manages unused areas in the pools and default value pages. If a server has never written data to a logical address 502 of a virtual volume 501, an address of a default value page is stored in the pool volume number and the logical address corresponding to the logical address 502 of the virtual volume 501.

Furthermore, the dynamic mapping table 301 manages the pool volume number and the logical address of unused pages in a pool. If the server writes data for the first time to a location of the logical address 502 of the virtual volume 501 where data has never been written, the pool volume number and the logical address of the unused page are associated with the logical address 502 of the virtual volume 501.

Also, each virtual volume belongs to a pool and the pool number 506 is used in the dynamic mapping table 301 to manage association between the pool number 506 and the virtual volume number 501 to see which virtual volume belongs to the relevant pool.

FIG. 6 shows the structure of the logical physical address conversion table 308. One entry of the logical physical address conversion table shows the correspondence relationship between a pool volume 204 and an area of a physical drive (113 or 114) storing data of the relevant pool volume. The pool volume is identified with a pool volume number 601. The area of the physical drive is identified with a physical drive number 602 and a start address 603 of the relevant physical drive. In this embodiment, the correspondence relationship is managed by associating one pool volume with a continuous area of one physical disk, but other manners of association may be used. Alternatively, two-level management may be performed by associating one pool volume with part of a logical area created by a plurality of drives forming a RAID structure and then associating the logical area with an area of the physical drives.

FIG. 7 shows a structure of the per-page monitoring table 302. One entry of the per-page monitoring table shows monitor information of one page 202. A monitor information index number 701 is an index number used to identify the monitor information. An I/O counter (A-side) 702A and an I/O counter (B-side) 702B indicate the number of I/Os for a certain page.

The I/O counter 702 stores the number of I/Os in a constant cycle. This cycle is the same as the cycle for operating the aforementioned frequency distribution creation processing 402 and the number of I/Os in this constant cycle is the processing target of the frequency distribution creation processing 402. A collection target counter is switched between the I/O counter (A-side) 702A and the I/O counter (B-side) 702B, for example, every cycle, so that one of them is used as a monitor collecting counter by the host I/O processing program 401 and the destaging processing program 404, while the other counter is used as a counter for the frequency distribution creation processing 402 and the page relocation processing program 405. This is why two I/O counters exist. Needless to say, the number of the I/O counters may be three or more and they may be switched and used.

Furthermore, a weighted average counter 1 (703A) and a weighted average counter 2 (703B) retain values for calculating calculation counters. For example, the weighted average counter 1 retains a short-term calculation counter value and the weighted average counter 2 retains a long-term calculation counter value. Since the number of the weighted average counters depends on the number of counters managed by the weighted index table (303 or 304 or 307) described later, there may be two or more weighted average counters.

FIG. 8 shows the configurations of the pool frequency distribution table 306 and the virtual volume frequency distribution table 305. The pool frequency distribution table 306 manages distribution of the number of pages for each range of the number of I/Os with respect to the pools 206. One entry of the pool frequency distribution table shows one range of the number of I/Os for a certain pool and the number of pages included in the relevant range of the number of I/Os. The number of I/Os 802 indicates a start value of the range of the number of I/Os. An end value of the relevant range is (a start value of the range of the number of I/Os for the next entry—1). The number of pages 803 corresponds to the number of pages included in the relevant range of the number of I/Os. This table also manages the tier allocation thresholds 208. The tier allocation threshold may be a value equal to or more than 0 and does not necessarily have to be a boundary value of each range.

The virtual volume frequency distribution table 305 manages distribution of the number of pages for each range of the number of I/Os with respect to the virtual volumes 201. Since its table structure is the same as that of the pool frequency distribution table 306, its detailed explanation has been omitted.

FIG. 9 shows the structure of the pool weighted index table 303. The pool weighted index table is a table for managing various parameters used to calculate calculation counters for each pool 206. Details of various calculation methods using values in the pool weighted index table will be explained later.

As stated in the description of the per-page monitoring table 302, each page 202 has a plurality of weighted average calculation counters 703. The number of counters stated in a type 903 column indicates the number of the weighted average calculation counters. A weighted average calculation counter number 902 corresponds to the weighted average calculation counter. In this embodiment, the weighted average calculation counter 1 (703A) is set as 1 and the weighted average calculation counter 2 (703B) is set as 2. The pool weighted index table also retains types 903 of parameters used to calculate the calculation counter values, and a value 904 of each parameter for each weighted average calculation counter. Different types of parameters may be used as the parameters, depending on a method for calculating the weighted average calculation counters. In this embodiment, there are two weighted values: a weighted value of the weighted average calculation counter; and a weighted value of the I/O counter. The weighted value of the weighted average calculation counter needs to be a value equal to or more than 0 and the weighted value of the I/O counter needs to be a value more than 0.

A weighted value in combined total indicates a weighted value of each weighted average calculation counter, which is used to calculate the number of I/Os for the page by calculating a combined total of the respective weighted average calculation counters. In this embodiment, an average value calculation method (AVG) or a maximum value calculation method (MAX) are prepared as combined total calculation methods. It is a matter of course that other combined total calculation methods may be used.

FIG. 10 shows the structure of the virtual volume weighted index table 307. The virtual volume weighted index table is a table for managing various parameters used to calculate the calculation counters for each virtual volume 201. Since a weighted average calculation counter number 1002, type 1003, and value 104 have been described with respect to the pool weighted index table 303, its detailed explanation has been omitted.

FIG. 11 shows the structure of the page weighted index table 304. The page weighted index table is a table for managing various parameters used to calculate the calculation counters for each page 202. In this table, the page 202 is identified with a virtual volume number 1101 and a logical address area 1102, but other identification methods may be used. Since a weighted average calculation counter number 1103, type 1104, and value 1105 have been described with respect to the pool weighted index table 303, its detailed explanation has been omitted.

Figure 12:
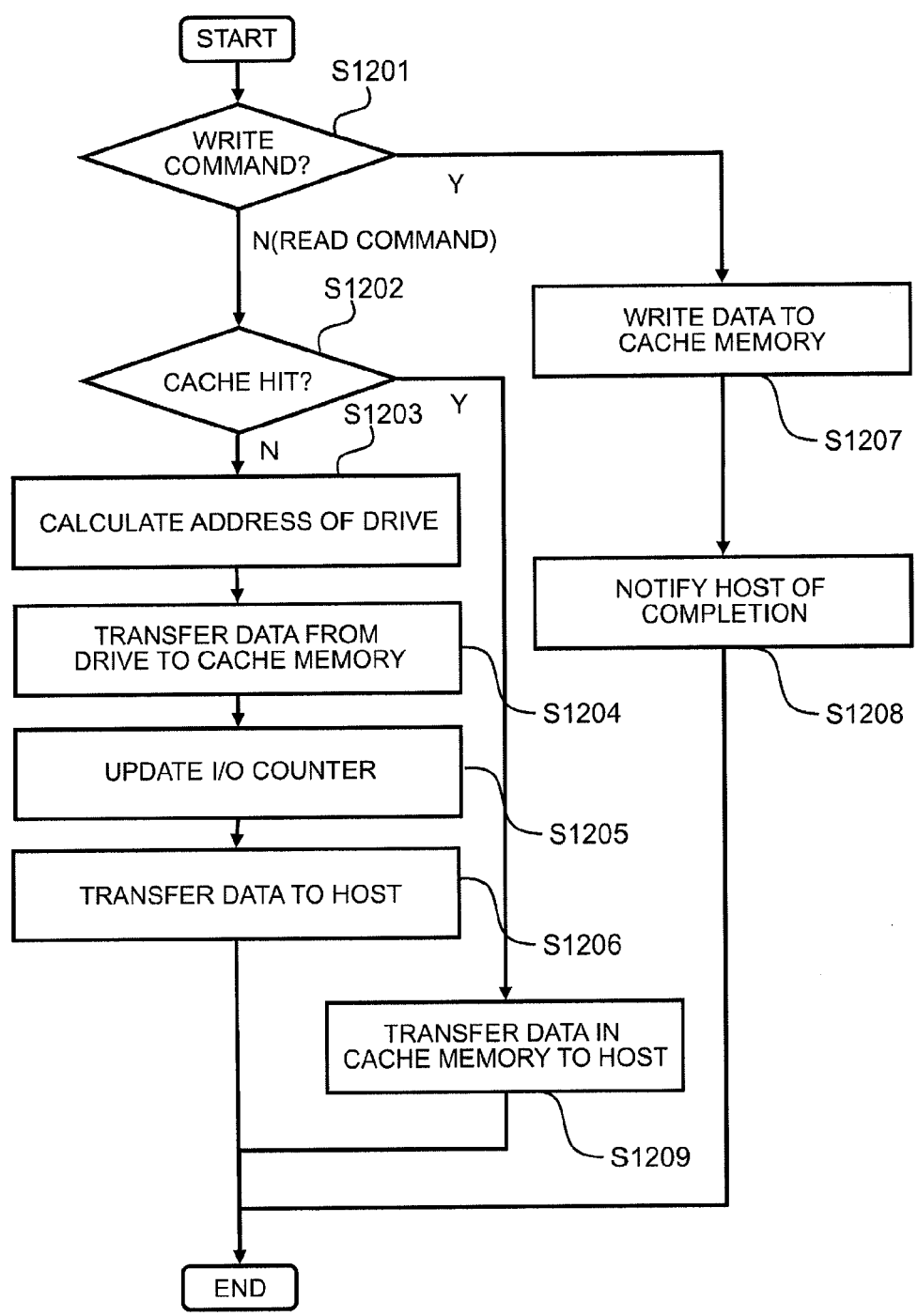
FIG. 12 is a flowchart illustrating host I/O processing program 401.

FIG. 12 is a flowchart illustrating processing by the host I/O processing program 401 in the storage system 104 when the host reads data from, or writes data to, a virtual volume 201.

After receiving an I/O processing request from the host, the host I/O processing program 401 in the storage system 104 judges whether the I/O processing request is a data read request or a data write request to the virtual volume 201 (S1201).

If the I/O processing request is the write request, the host I/O processing program 401 checks if an area corresponding to the address of a virtual volume corresponding to the I/O processing request is allocated in the cache memory 110; and if the area is allocated, or after the area is allocated in the cache memory 110 if it is not allocated, the host I/O processing program 401 responds to the host, reporting that write data can be transferred; writes write data, which is transferred from the host, to the allocated area in the cache memory; and sets a dirty flag to a cache memory management table in order to indicate that it is an area where the data has not been written to the disks yet (S1207).

The dirty flag herein used is information indicative of a state where data exists only in the cache memory, but not in the disks; and is retained in the cache memory management table for managing areas in the cache memory. The destaging processing program 404 described later checks this dirty flag and then writes data in the cache memory to the disks.

After the data in the area, for which the dirty flag is set to the cache memory management table, is written to the disks, the dirty flag is set off, a clean flag is set to the information in the cache memory management table including a case where data which has been read from the disks in response to read processing is stored in the cache memory.

The cache memory management table retains and manages at least the addresses of the virtual volumes corresponding to the addresses in the cache memory and the state of data in the cache memory as described above. Regarding the addresses of the virtual volumes corresponding to the addresses in the cache memory, the addresses of the virtual volumes, which are valid values, are stored only when areas in the cache memory are allocated in order to store data of the virtual volumes.

After S1207 above, the host I/O processing program 401 responds to the host, reporting the completion of the write I/O processing (S1208); and then terminates the processing.

On the other hand, if it is determined in S1201 that the I/O processing request is a read request, the following processing will be executed.

If the I/O processing request is a read request, the host I/O processing program 401 checks if data corresponding to the address in a virtual volume corresponding to the I/O processing request exists in the cache memory or not (S1202).

A case where data whose address was requested by the host exists in the cache memory in S1202 is called a cache hit. In a case of the cache hit, the host I/O processing program 401 transfers the data in the cache memory to the host (S1209).

After transferring all pieces of the data requested by the host, the host I/O processing program 401 transfers a read processing completion response to the host, thereby terminating the processing.

In a case of a cache miss in S1202, the host I/O processing program 401 allocates an area in the cache memory in order to store data corresponding to the address of a read request target virtual volume. Next, the host I/O processing program 401 checks if a page 202 is allocated from a pool to the virtual volume address of the read request from the host, by using the dynamic mapping table 301. If such an area is not allocated, the host I/O processing program 401 finds a page storing a default value by using the dynamic mapping table 301, calculates the address of the drive for the page storing the default value, transfers the default value from the drive to the allocated area in the cache memory (S1204).

In a case of the default value, the pool volume number and the logical address of the page storing the default value are set to the pool volume number and the logical address corresponding to the virtual volume and the logical address in the dynamic mapping table.

One or more default value pages in a pool should be enough. In consideration of capacity efficiency, there should be one or two default value pages in a pool.

When new data is written from the host, the logical address of the virtual volume associated with the address of the default value page is then newly associated with an unused page which is a page used by the host to write data and has not been associated to the address of any virtual volume.

If a page 202 is allocated in the above-described processing, the host I/O processing program 401 calculates the address of the drive storing data corresponding to the address of the virtual volume requested by the host by finding the pool volume number and the logical address, using the dynamic mapping table 301, and further finding the physical drive number and the physical start address, using the logical physical address conversion table 308 (S1203). Next, the host I/O processing program 401 transfers data from the calculated drive address to the allocated area in the cache memory (S1204).

The host I/O processing program 401 updates the I/O counter value in the per-page monitoring table 302 corresponding to the monitor information index number in the dynamic mapping table 301 when transferring the data to the cache memory (S1205).

Next, the host I/O processing program 401 sends the data, which was stored in the cache memory from the drive, from the cache memory to the host (S1206).

After transferring all the pieces of data requested by the host to the host, the host I/O processing program 401 transfers a read processing completion response to the host, thereby terminating the processing.

Figure 13:
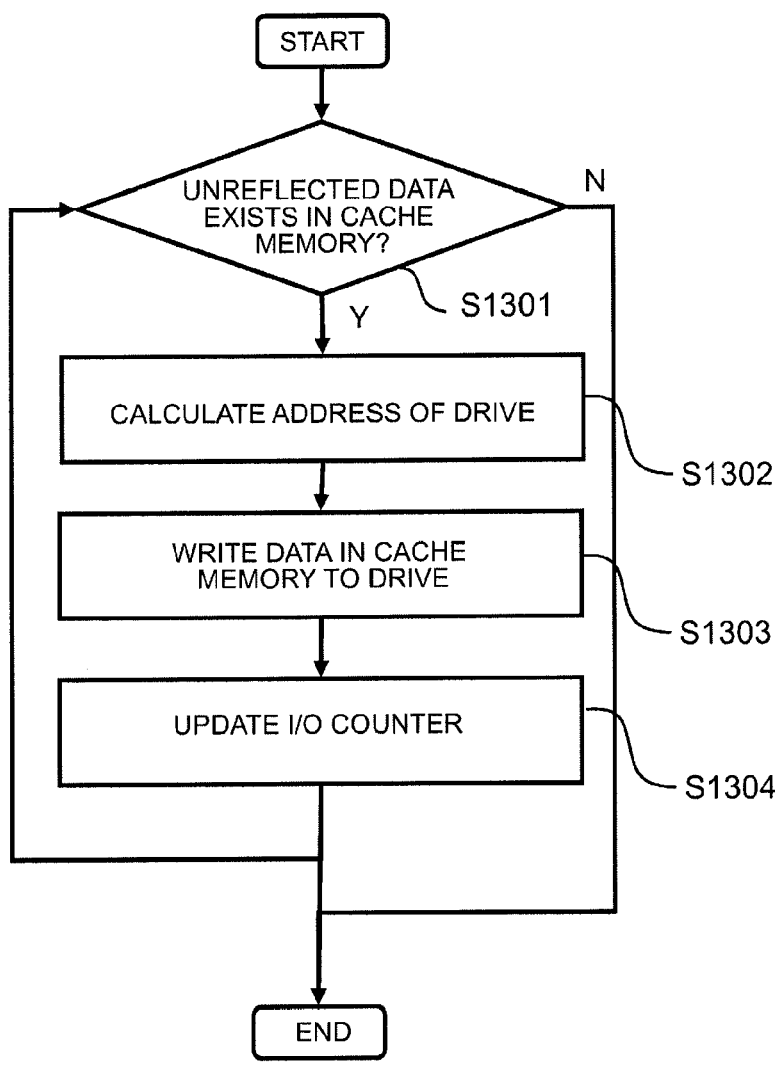
FIG. 13 is a flowchart illustrating destaging processing program 404.

FIG. 13 is a flowchart of the destaging processing program 404.

The host I/O processing program writes write data from the host to the cache memory in response to a data write request from the host and then sets the dirty flag as shown in FIG. 12.

The destaging processing program 404 refers to the cache memory management table and periodically checks if there is any data, which has not been written to the disks and to which the dirty flag is set, in the cache memory (S1301).

If any cache area with data to which the dirty flag is set is found, the destaging processing program 404 finds the pool volume number and the logical address from the dynamic mapping table 301 based on the virtual volume number and the logical address stated in the cache memory management table.

When this is performed, if the pool volume number and the logical address indicate the address of a default page, the destaging processing program 404 allocates a new unused page from the dynamic mapping table 301 in order to write new data. Then, the pool volume number and the logical address of the allocated page are stored by associating them with the virtual volume number and the logical address corresponding to this destaging processing in the dynamic mapping table 301.

If a page is already allocated, values of the pool volume number and the logical address which are different from the pool volume number and the logical address of the default value are stored corresponding to the logical address 502 of the virtual volume 501.

After the pool volume number and the logical address are found, the destaging processing program 404 finds the address of the drive in the logical physical address conversion table (S1302).

The destaging processing program 404 writes dirty data in the cache memory to the address of the drive found in S1302 (S1303).

The destaging processing program 404 then updates the I/O counter value in the per-page monitoring table 302 corresponding to the monitor information index number in the dynamic mapping table 301 (S1304).

Furthermore, the destaging processing program 404 checks if any data which has not been written/migrated to the disks exists in the cache memory (S1301). If there is no such data, the destaging processing program 404 terminates the processing; and if there is data which has not been written/migrated to the disks, the destaging processing program 404 executes the processing again from S1302.

Figure 14:
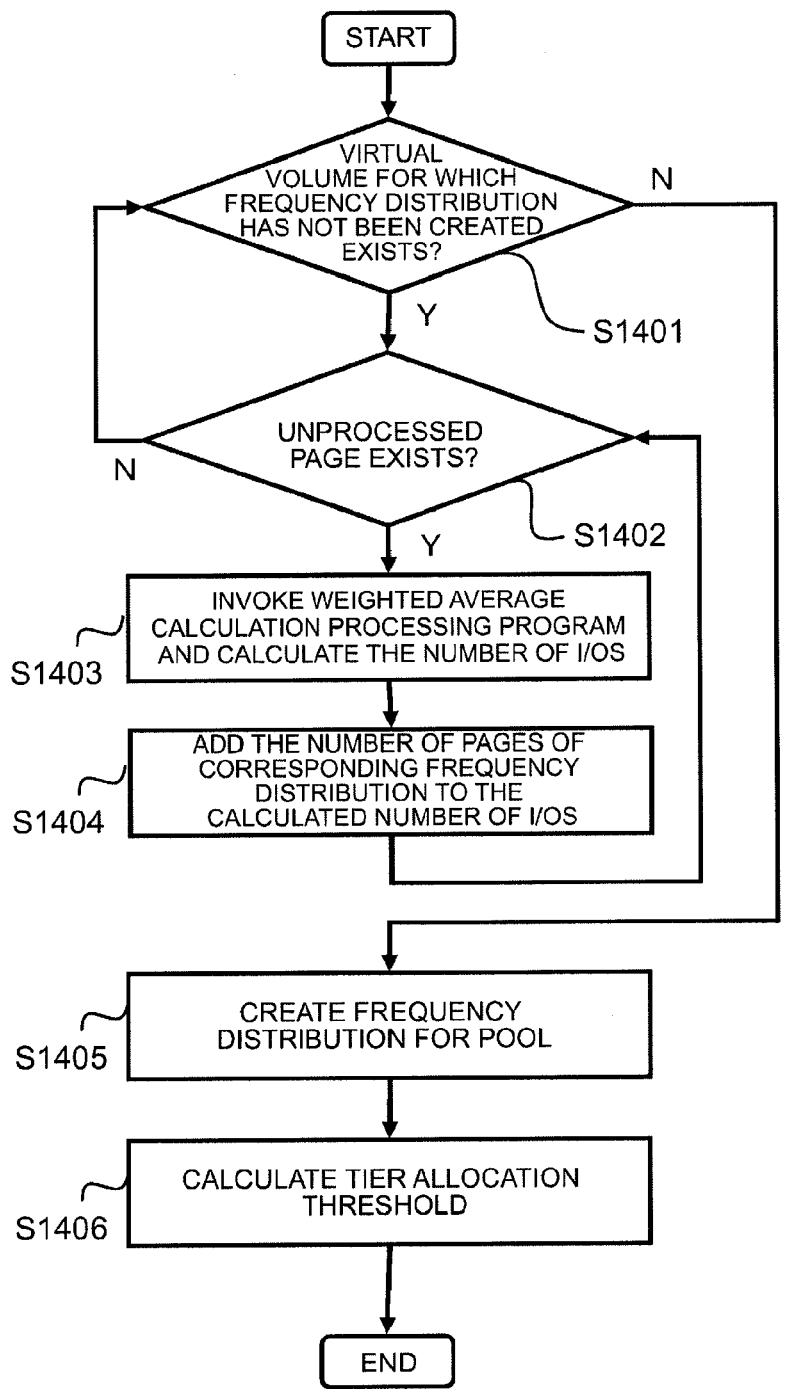
FIG. 14 is a flowchart illustrating frequency distribution creation processing program 402.

FIG. 14 is a flowchart of the frequency distribution creation processing program 402.

This program creates frequency distribution on a virtual volume basis. So, the frequency distribution creation processing program 402 checks whether or not any virtual volume for which the frequency distribution has not been created exists (S1401).

If it is determined in step S1401 that a virtual volume for which the frequency distribution has not been created exists, the frequency distribution creation processing program 402 checks, from the top of the volume, whether an unprocessed page exists or not, in order to create the frequency distribution in the relevant virtual volume (S1402).

If it is determined in step S1402 that an unprocessed page exists, the frequency distribution creation processing program 402 invokes the weighted average calculation processing program 403 and calculates the number of I/Os (S1403).

Subsequently, the frequency distribution creation processing program 402 adds the number of pages of the corresponding frequency distribution to the calculated number of I/Os (S1404) and then returns to S1402.

If it is found that there is no unprocessed page to the end of the relevant volume with respect to the virtual volume being executed or processed, the frequency distribution creation processing program 402 returns to S1401 in order to check if any other virtual volume exists.

If there is no more virtual volume for which the frequency distribution has not been created, the frequency distribution creation processing program 402 creates pool frequency distribution (S1405). The pool frequency distribution is calculated by calculating a total value of the virtual volume frequency distribution. Specifically speaking, the frequency distribution creation processing program 402 calculates a total sum of the number of pages 803 corresponding to the number of I/Os 805 for each virtual volume number 804 belonging to a target pool, using the virtual volume weighted index table 307; and stores it as the number of pages 805 corresponding to the number of pages 802 in the pool frequency distribution table 306.

Subsequently, the frequency distribution creation processing program 402 calculates and decides the tier allocation threshold 208 (S1406). Regarding the tier allocation threshold 208, there is a method of deciding, for each tier, the range 210 of the maximum page allocation amount from a limiting point of either the potential of the tier (the maximum number of I/Os that can be processed) or the capacity of the tier and then calculating the tier allocation threshold 208 from an intersection of the range 210 and the frequency distribution graph 209. Also, a method of using a threshold designated by the user may be used.

Figure 15:
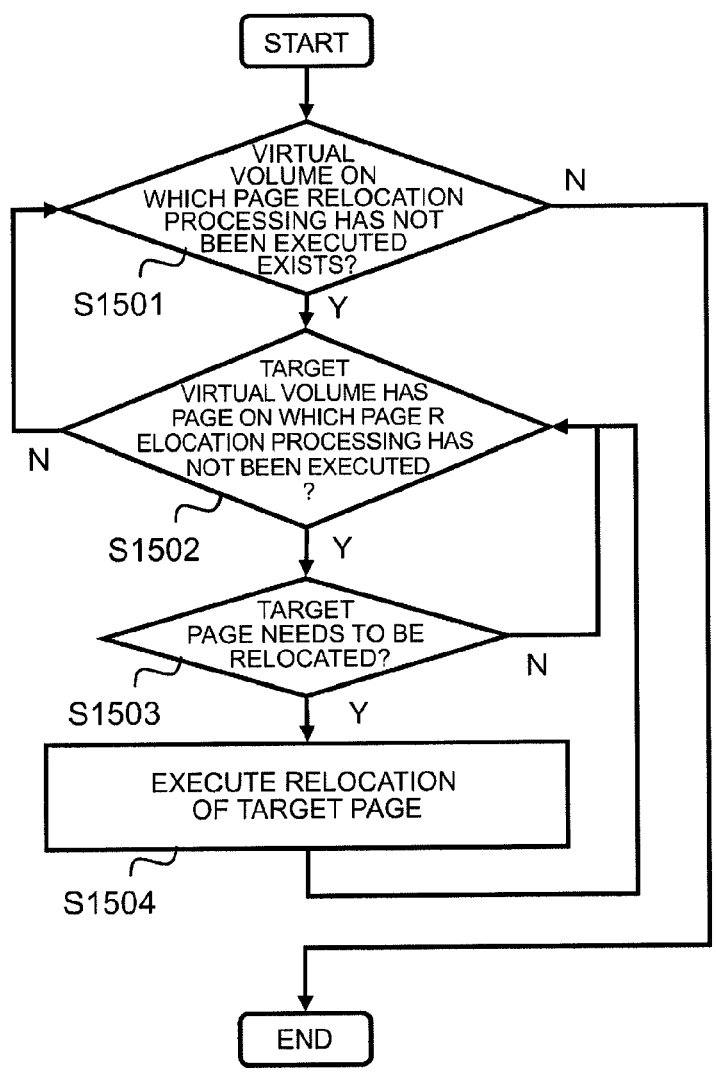
FIG. 15 is a flowchart illustrating page relocation processing program 405.

FIG. 15 is a flowchart of the page relocation processing program 405.

If the frequency distribution creation processing program terminates and the tier allocation threshold 208 for page relocation is decided, the page relocation program 405 relocates the page, which is allocated to each virtual volume, to an appropriate tier in the pool based on the tier allocation threshold 208.

The page relocation program 405 judges whether it is fine for data to stay in the currently located tier or the data should be migrated to a different tier, according to the number of I/Os, which is calculated by the weighted average calculation program, for the page to which the virtual volume defined in the pool is allocated from its top, and the tier allocation threshold 208. If it is determined that the data should be migrated to a different tier, the page relocation program 405 migrates the data in the page to an unused page in another tier and changes the relationship between the logical address 502, the pool volume number, and the logical address of the virtual volume 501 in the dynamic mapping table 301 to the migration destination page.

Firstly, the page relocation program 405 checks whether or not any virtual volume on which the page relocation processing has not been executed exists (S1501).

If there is a virtual volume on which the page relocation processing has not been executed, the page relocation program 405 checks, for each allocated page sequentially from the top of the target virtual volume to its end, whether the relocation is required or not (S1502, S1503). Specifically speaking, checking whether the relocation is required or not is to judge whether it is fine for data to stay in the currently located tier or the data should be migrated to a different tier, based on the tier allocation threshold 208 in the pool frequency distribution table 306 for the target pool. More specifically, the tier allocation threshold 208A for Tier 1 and Tier 2 and the tier allocation threshold 208B for Tier 2 and Tier 3 are compared with the number of I/Os of the I/O counter 702 for the target page. For example, if a value of the I/O counter 702 is larger than the tier allocation threshold 208A and the current tier for the target page is Tier 2, the target page should be promoted to Tier 1, so that relocation is required. If the current tier for the target page is Tier 1, the target page is already located in Tier 1, so that relocation is not required. As a method for finding out the current tier for the target page, in which tier the target page is currently located can be judged from the pool volume number based on the relationship between the logical address 502 and the pool volume number of the virtual volume 501 in the dynamic mapping table 301.

If the relocation is required in step S1503, the page relocation program 405 relocates the target page (S1504).

If the relocation is not required or after the target page is relocated, the page relocation program 405 checks whether the next page in the virtual volume is a relocation target page or not (S1502, S1503).

After executing the relocation processing on the entire virtual volume, the page relocation program 405 checks another virtual volume on which the relocation processing has not been executed; and continues checking virtual volumes until there is no more virtual volume on which the page relocation processing has not been executed (S1501).

Incidentally, in a case of cyclical processing, the page relocation program terminates once at the end of the cyclical processing; and the page relocation program continues executing the page relocation processing again for the next cyclical processing. If the relocation processing has terminated before the end of the cycle, the page relocation processing terminates once at that point in time and is then newly executed on each virtual volume in the next cycle.

FIG. 16 shows examples of calculation formulas of a weighted average calculation counter 1 (703A) value, a weighted average calculation counter 2 (703B) value, and an I/O counter value 702. In this embodiment, the weighted average calculation counter 1 value (c[1]_new) and the weighted average calculation counter 2 value (c[2]_new) are firstly calculated based on a counter value of the number of I/Os (a_count) for the relevant page, which was counted in a constant cycle by, for example, the host I/O processing program 401 and the destaging processing program 404 (1601 and 1602). Then, the number of I/Os (a_result) for the relevant page is calculated by obtaining a combined total of the weighted average calculation counter 1 value and the weighted average calculation counter 2 value (1603).

Firstly, the weighted average calculation counter 1 value (c[1]_new) is calculated according to a calculation formula indicated as 1 604 by using the weighted value of the weighted average calculation counter (p[1]_1) and the weighted value of the counter for the number of I/Os (p[1]_2), which are managed by the weighted index table (303 or 304 or 307), as weighted indexes 1607. Since the weighted average calculation counter 1 is herein used as a counter in a short cycle, the weighted value of the weighted average calculation counter (p[1]_1) is set as light weight. In an example shown in the drawing, the weighted value of the weighted average calculation counter (p[1]_1) is 3 and the weighted value of the counter for the number of I/Os (p[1]_2) is 1. Then, if the weight of the value of the counter for the number of I/Os (the number of I/Os of the latest measurement cycle) is 1, the value of the counter for the number of If Os is calculated by considering the weight of the weighted average calculation counter value (the number of I/Os in the past) as 3. For example, if the weighted value of the weighted average calculation counter (p[1]_1) is set as 0, that is, no weight, the calculation result will completely ignore the number of I/Os in the past and become the value of the number of I/Os of the latest measurement cycle itself. The calculation formula is a formula for calculating a weighted average of the counter value of the number of I/Os (a_count) and the weighted average calculation counter 1 value (c[1]_old) which was calculated last time. The calculated weighted average calculation counter 1 value (c[1]_new) is used as the c[1]_old value when calculating the number of I/Os next time. Therefore, the weighted average calculation counter 1 (703A) value is updated with c[1]_new.

Similarly, the weighted average calculation counter 2 value (c[2]_new) is calculated according to a calculation formula indicated as 1605 by using the weighted value of the weighted average calculation counter (p[2]_1) and the weighted value of the counter for the number of I/Os (p[2]_2), which are managed by the weighted index table (303 or 304 or 307), as the weighted indexes 1607. Since the weighted average calculation counter 2 is herein used as a counter in a long cycle, the weighted value of the weighted average calculation counter (p[2]_1) is set as heavy weight. In the example shown in the drawing, the weighted value of the weighted average calculation counter (p[2]_1) is 127 and the weighted value of the counter for the number of I/Os (p[2]_2) is 1. Then, if the weight of the value of the counter for the number of I/Os (the number of I/Os of the latest measurement cycle) is 1, the value of the counter for the number of I/Os is calculated by considering the weight of the weighted average calculation counter value (the number of I/Os in the past) as 127. In other words, as compared to the above-mentioned case of the short cycle, the number of I/Os of the latest measurement cycle has less influence on the weighted average calculation counter value. The calculation formula is a formula for calculating a weighted average of the counter value of the number of I/Os (a_count) and the weighted average calculation counter 2 value (c[2]_old) which was calculated last time. The calculated weighted average calculation counter 2 value (c[2]_new) is used as the c[2]_old value when calculating the number of I/Os next time. Therefore, the weighted average calculation counter 2 (703B) value is updated with c[2]_new. The case where the number of counters is set as 2 in the type 903 has been described above. Regarding a case where the number of counters is set as 3 or more in the type 903, the calculation will be performed in the same manner with respect to a weighted average calculation counter 3 value (c[3]_new) and any subsequent counter(s). Furthermore, if the number of counters is set as 1 in the type 903, the above-described calculation of the weighted average calculation counter 2 value (c[2]_new) will not be performed.

The number of I/Os (a_result) for the relevant page is calculated as an average value or a maximum value based on the weighted average calculation counter 1 value (c[1]_new) and the weighted average calculation counter 2 value (c[2]_new) in accordance with the combined total calculation method managed by the weighted index table (303 or 304 or 307) (1606). When calculating the average value or the maximum value, the weighted value in combined total (p[1]_merge) of the weighted average calculation counter 1 and the weighted value in combined total (p[2]_merge) of the weighted average calculation counter 2, which are managed by the weighted index table, are used as the weighted values in combined total 1608, thereby weighting each weighted average calculation counter. The 110 counter value 702 is updated with the calculated number of I/Os (a_result) for the relevant page. The case where the number of counters is set as 2 in the type 903 has been described above. Regarding a case where the number of counters is set as 3 or more in the type 903, the calculation will be performed in the same manner with respect to the weighted average calculation counter 3 value (c[3]_new) and any subsequent counter(s). Furthermore, if the number of counters is set as 1 in the type 903, the calculation of the average value and the maximum value will not be performed.

It is possible to set different values of the weighted value of the weighted average calculation counter (p[X]_1) and the weighted value of the counter for the number of I/Os (p[X]_2) for each weighted average calculation counter as described above. The number of I/Os (a_result) which is a combination of loads in different cycles can be calculated by setting a different value (specific gravity) of (p[X]_1/p[X]_2) to each weighted average calculation counter. When the relationship of (p[X]_1/p[X]_2)>(p[Y]_1/p[Y]_2) is satisfied, the weighted average calculation counter X is a long cycle and the weighted average calculation counter Y is a short cycle.

Furthermore, reference is made only to the weighted average calculation counters with respect to the formulas in FIG. 16 when calculating the I/O counter value (1606); however, the counter value of the number of I/Os (a_count) itself may be included as a calculation target of the maximum value or the average value. In this case, a weighted value in combined total for the counter value of the number of I/Os (a_count) may be provided in the same manner and a multiplication of the weighted value in combined total and the number of I/Os may be included in calculation of the I/O counter value. For example, if p[1]_1 is 0, the calculation result of c[1]_new will be equivalent to the counter value of the number of I/Os (a_count). So, an amount of storage areas used by the weighted average calculation counter 1 value (c[1]_new) can be reduced by not providing the weighted average calculation counter 1 value (c[1]_new), but using the counter value of the number of I/Os (a_count) instead by the above-described method.

In a case of the maximum value, the maximum value will not become a low value because of the low counter value for the long cycle viewpoint in response to a rapid increase of the number of I/Os, so that it has an advantageous effect of the ability to implement promotion more promptly. Furthermore, in the case of the maximum value, the number of I/Os increases with respect to the pool as a whole and the maximum performance of the tier will be relatively considered to be low. As a result, tier arrangement with sufficient flexibility will be realized so that the tier will hardly enter a neck state in response to a rapid load fluctuation.

In a case of the average value, the average value will be an average with the lower counter value for the long cycle viewpoint in response to a rapid increase of the number of I/Os and will not increase/change abruptly, so that more sensitive promotion than that of the maximum value cannot be performed, but an amount of page relocation between tiers by promotion can be reduced. Furthermore, in the case of the average value, the average value has the characteristics, as compared to the maximum value, that the number of I/Os with respect to the pool as a whole becomes closer to the actual number of I/Os and the tier arrangement cable of exhibiting the maximum performance of the tiers can be realized.

Incidentally, in this embodiment, the parameters (weighted indexes) for the weighted average calculation counters can be changed. Accordingly, when a change occurs in the characteristics of host 110 and the weighted average calculation counters need to be modified, such modification can be implemented by changing the parameters.

Specifically speaking, the above-described case is a case where a temporary load stop period is shortened as the host I/O characteristics. For example, if the measurement cycle is a one-hour cycle, and assuming that there is a job operating on weekdays (5 days) and not operating on weekends (2 days) and a schedule has been changed so that the job would operate cyclically for two hours in a four-hour cycle, this means that there is a load stop period of about two hours. In this case, since such a load stop period is different from the previously assumed load stop period of about two days, that is, Saturday and Sunday, demotion for the two-hour load stop period can be sometimes prevented by using only the weighted average calculation counter for the short cycle without using the weighted average calculation counter for the long cycle. Specifically speaking, as a result of setting p[1]_1 and p[1]_2 of the weighted average calculation counter 1 value (c[1]_new) as 3 and 1, respectively, the use of even only the load indexes by one weighted average calculation counter can prevent demotion due to temporary reduction of the number of I/Os for a specific page from the long cycle viewpoint (corresponding to the short cycle in the conventional settings) and enables prompt promotion in the set cycle (one hour) in response to an increase in the number of I/Os for the specific page. In this case, the second weighted average calculation counter used in the conventional settings is released according to a command from the management device, so that a used amount of the memory necessary for monitoring and the calculation load can be reduced.

If the measurement cycle is changed in the middle of the operation of the system, temporal weighting by the above-described method will change. The load weight is changed according to the changed measurement cycle in order to maintain the same temporal weighting. For example, assuming that the current measurement cycle is one hour and the weighted indexes are p[1]_1=3, p[1]_2=1 (Short-Range), p[2]_1=127, and p[2]_2=1 (Long-Range), and if the measurement cycle is to be changed to t hours, the weighted indexes are set to p[1]_1=4/t−1, p[1]_2=1, p[2]_1=128/t−1, p[2]_2=1. If the weighted indexes are corrected as described above, it is possible to maintain the same temporal weighting. Generally, when the current measurement cycle is t1 hours and the measurement cycle is to be changed to t2 hours, the following formula is satisfied:

q[X]_1=(p[X]_1+p[X]_2)/(t2/t1)−p[X]_2, q[X]_2=p[X]_1, where p represents weighted indexes which have been used, and q represents a weighted index which should be set next. Regarding this correction of the weighted indexes, the storage system can automatically calculate the current measurement cycle according to a change of the setting of the measurement cycle, using the aforementioned calculation formula, or the user can calculate the current measurement cycle according to the abovementioned calculation formula and set it on a GUI.

Figure 17:
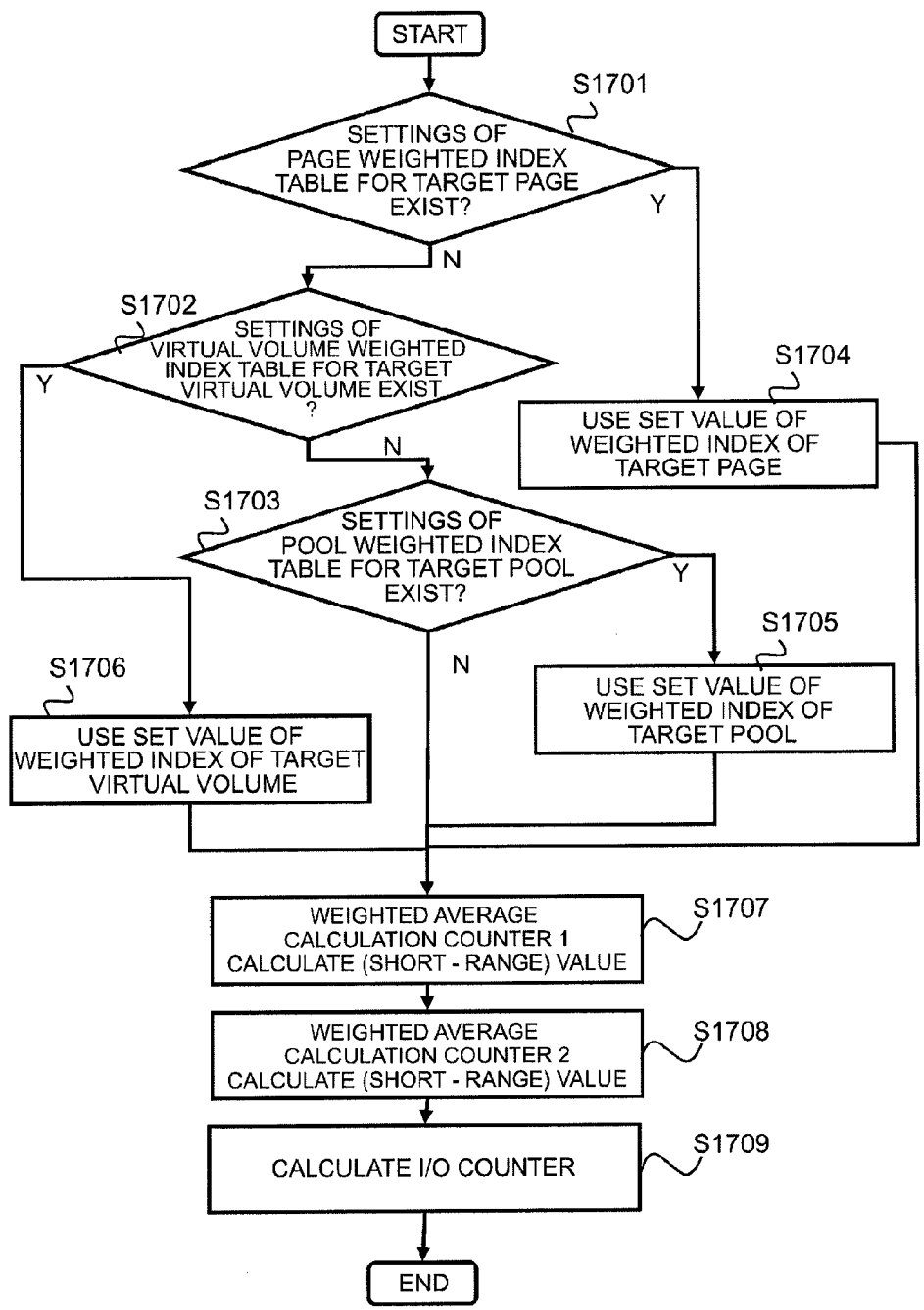
FIG. 17 is a flowchart illustrating weighted average calculation processing program 403.

FIG. 17 is a flowchart of the weighted average calculation processing program 403.

Firstly, in step S1701, the weighted average calculation processing program 403 judges whether the settings of the page weighted index table for a target page exists or not. Specifically speaking, the weighted average calculation processing program 403 checks whether or not an entry of the target page exists in the page weighted index table 304. If there is an entry of the target page, the weighted average calculation processing program 403 jumps to step S1704, decides to use a weighted value of the target page as a set value of the weighted index (step S1704), and then jumps to step S1707. If there is no entry of the target page, the weighted average calculation processing program 403 jumps to step S1702.

In S1702, the weighted average calculation processing program 403 judges whether the settings of the virtual volume weighted index table for a target virtual volume including the target page exists or not. Specifically speaking, the weighted average calculation processing program 403 checks whether or not an entry of the target virtual volume including the target page exists in the virtual volume weighted index table 304. If there is an entry of the target virtual volume, the weighted average calculation processing program 403 jumps to step S1706, decides to use a weighted value of the target virtual volume as a set value of the weighted index (step S1706), and jumps to step 1707. If there is no entry of the target virtual volume, the weighted average calculation processing program 403 jumps to step S1703.

In S1703, the weighted average calculation processing program 403 judges whether the settings of the pool weighted index table for a target pool including the target page exists or not. Specifically speaking, the weighted average calculation processing program 403 searches the dynamic mapping table for a pool including the target page, recognizes that pool as the target pool, and checks whether or not an entry of the target pool exists. If there is an entry of the target pool, the weighted average calculation processing program 403 jumps to step S1705, decides to use a weighted value of the target pool as a set value of the weighted index (step S1705), and jumps to step S1707. If there is no entry of the target pool, the weighted average calculation processing program 403 jumps to step S1707.

In step S1707, the weighted average calculation processing program 403 uses the type of the weighted average calculation counter 1 (Short-Range) from among the weighted values decided in step S1704, step S1705, or step S1706 to calculate a counter value of the weighted average calculation counter 1 (Short-Range). Since the calculation method was explained with reference to FIG. 16, its detailed explanation is omitted here.

In step S1708, the weighted average calculation processing program 403 uses the type of the weighted average calculation counter 2 (Long-Range) from among the weighted values decided in step S1704, step S1705, or step S1706 to calculate a counter value of the weighted average calculation counter 2 (Long-Range). Since the calculation method was explained with reference to FIG. 16, its detailed explanation is omitted here.

In step S1709, the weighted average calculation processing program 403 uses the weighted average calculation counter 1 value calculated in step S1707 and the weighted average calculation counter 2 value calculated in step S1708 to calculate a counter value of the I/O counter. Since the calculation method was explained with reference to FIG. 16, its detailed explanation is omitted here.

Incidentally, the case where there are two weighted average calculation counters have been described. If the number of the weighted average calculation counters is N, weighted average calculation counter values may be calculated by executing steps corresponding to step S1707 and step S1708 on each weighted average calculation counter; and the I/O counter value may be calculated by using N pieces of the weighted average calculation counters in step S1709.

Figure 18:
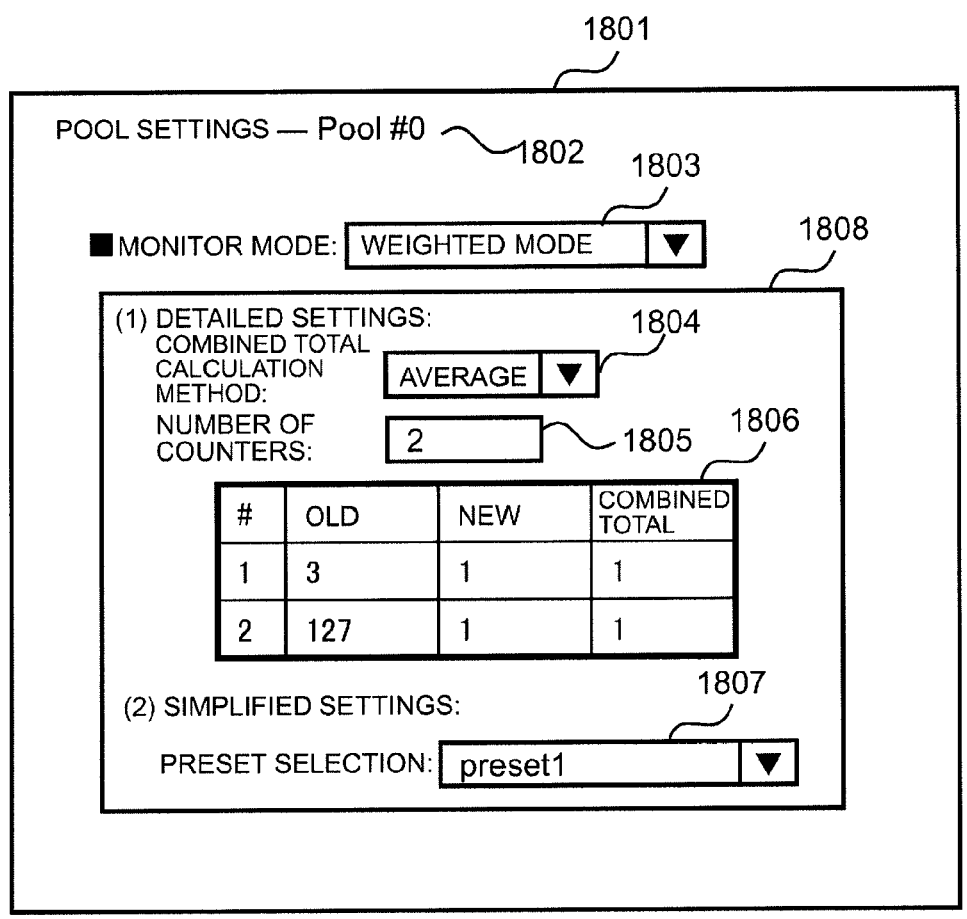
FIG. 18 is a diagram showing an example of a screen for making settings of, for example, a monitor mode, a combined total calculation method, and the number of counters, when executing pool-based page relocation processing.

FIG. 18 is a diagram showing an example of a screen for setting, for example, a monitor mode, a combined total calculation method, and the number of counters when executing pool-based page relocation processing.

A pool-based page relocation processing setting screen 1801 is composed of an area 1802 for displaying the pool number capable of identifying a setting target pool, an area 1803 for selecting a monitor mode, and an area 1808 for making detailed settings when a weighted mode is selected as the monitor mode.

The monitor mode herein used includes: a weighted mode for deciding page relocation based on the weighted average calculation disclosed in the present invention; and a non-weighted mode for deciding page relocation based on only the number of I/Os disclosed in the conventional technology.

The area 1808 for making the detailed settings when the weighted mode is selected as the monitor mode is composed of: an area 1804 for setting a method for calculating a combined total of the weighted average; an area 1805 for setting the number of counters to calculate the weighted average; an area 1806 for inputting weighted values of the weighted average calculation counters; and an area 1807 for selecting a preset selection capable of selecting a weighted average calculation method that is set in advance.

When the areas 1804, 1805, 1806 are set, the storage system newly sets or updates a pool entry specified in the area 1802 of the pool weighted index table. Specifically speaking, a weighted average calculation counter number entry equal to the number set to the area 1805 is provided. A value OLD, from among values set to the area 1806, is registered as a type of the weighted value of the weighted average calculation counter in each weighted average calculation counter number entry. A value NEW is registered as a type of the weighted value of the I/O counter. A value COMBINED TOTAL is registered a type of the weighted value type in combined total. If AVERAGE is selected in the area 1804, AVG is registered as the combined total calculation method type. If MAXIMUM is selected in the area 1804, MAX is registered as the combined total calculation method type. If MAXIMUM is selected in the area 1804 for setting the combined total calculation method, MAX is registered as the weighted value in combined total for the pool indicated in the area 1802 for displaying the pool number capable of identifying the setting target pool of the pool weighted index table.

Incidentally, setting values for the above-described detailed settings may be stored with a label like preSet1 so that the settings can be easily made in the area 1807.

Figure 19:
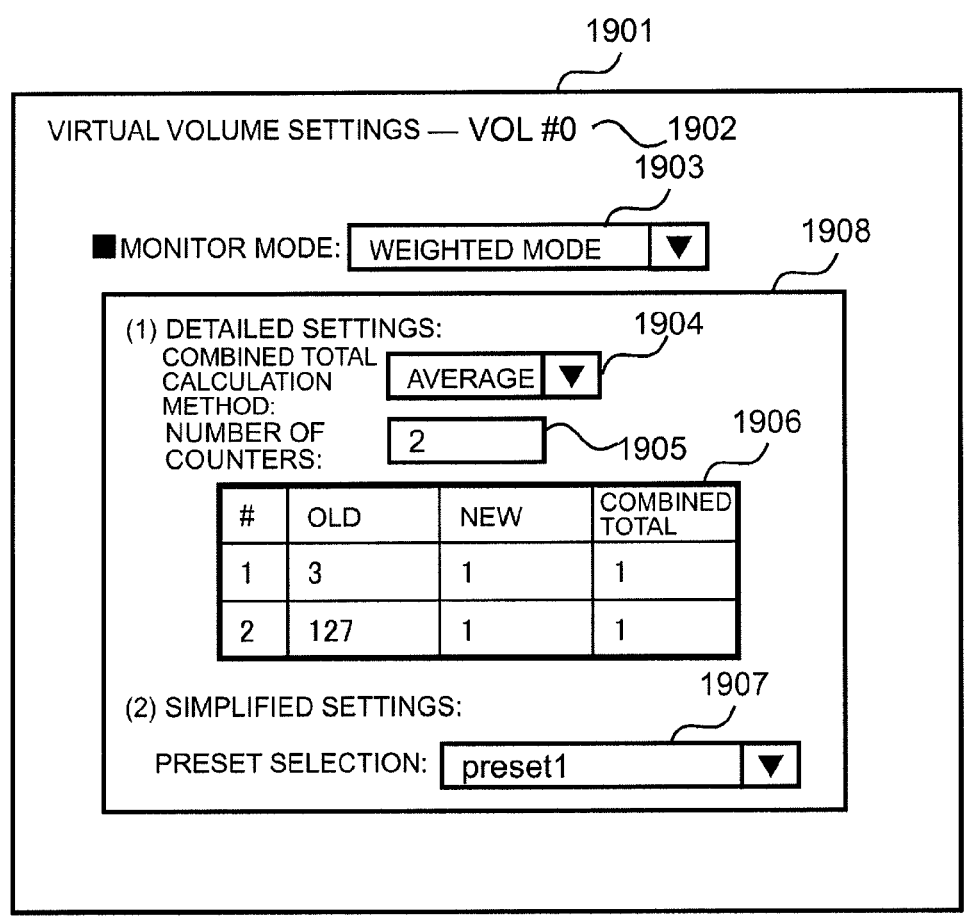
FIG. 19 is a diagram showing an example of a screen for making settings of, for example, a monitor mode, a combined total calculation method, and the number of counters, when executing virtual-volume-based page relocation processing.

FIG. 19 is a diagram showing an example of a screen for making settings of, for example, a monitor mode, a combined total calculation method, and the number of counters when executing virtual-volume-based page relocation processing.

A virtual-volume-based page relocation processing setting screen 1901 is composed of an area 1902 for displaying a virtual volume number capable of identifying a setting target virtual volume, an area 1903 for selecting a monitor mode, and an area 1908 for making the detailed settings when a weighted mode is selected as the monitor mode.

The monitor mode herein used includes: a weighted mode for deciding page relocation based on the weighted average calculation disclosed in the present invention; a non-weighted mode for deciding page relocation based on only the number of I/Os disclosed in the conventional technology; and no setting indicating that the virtual-volume-based relocation processing will not be executed because the pool-based page relocation processing is to be executed.

Since the area 1908 for making the detailed settings when the weighted mode is selected as the monitor mode, is configured as an area similar to that shown in FIG. 18, its explanation has been omitted. The difference between the area 1908 and the area in FIG. 18 is that an entry of the virtual volume weighted index table is newly set or updated.

FIG. 20 is a diagram showing an example of a screen for making settings of, for example, a monitor mode, a combined total calculation method, and the number of counters when executing page-based page relocation processing.

A page-based page relocation processing setting screen 2001 is composed of an area 2002 for displaying a virtual volume number and logical address capable of identifying a setting target page, an area 2003 for selecting a monitor mode, and an area 2008 for making the detailed settings when a weighted mode is selected as the monitor mode.

The monitor mode herein used includes: a weighted mode for deciding page relocation based on the weighted average calculation disclosed in the present invention; a non-weighted mode for deciding page relocation based on only the number of I/Os disclosed in the conventional technology; and no setting indicating that the virtual-volume-based relocation processing will not be executed because the pool-based or virtual-volume-based page relocation processing is to be executed.

Since the area 2008 for making the detailed settings when the weighted mode is selected as the monitor mode, is configured as an area similar to that shown in FIG. 18, its explanation has been omitted. The difference between the area 2008 and the area in FIG. 18 is that an entry of the page weighted index table is newly set or updated.

If the above-described calculation method(s) is adopted, even if a batch job or similar that operates only on weekends (Saturday and Sunday) experiences temporary reduction of load, demotion can be prevented and degradation of the performance on Monday can be prevented like monitoring for a long term. Also, promotion can be implemented in a short cycle and load on daily business can be tracked. FIG. 21 shows graphs specifically indicating the above-described advantageous effects.

A graph 2101 shows the sustained effect of the I/O counter when the load decreases on a weekend (Saturday and Sunday). The calculation is based on the following indexes: $p[1]\_1=3$, $p[1]\_2=1$ (Short-Range), $p[2]\_1=127$, $p[2]\_2=1$ (Long-Range). The vertical axis represents the number of I/Os which is the load, and the horizontal axis represents the time course. Line 2103 is a graph indicating time changes of the actual number of I/Os for a page, that is, the counter value of the number of I/Os (a_count). Line 2104 is a graph indicating time changes of the weighted average calculation counter 1 value (c[1]_new) (Short-Range). Line 2105 is a graph indicating time changes of the weighted average calculation counter 2 value (c[2]_new) (Long-Range). Line 2106 is a graph showing time changes of the number of I/Os (a_result) for the relevant page by the method according to the present invention. Line 2107 is a line indicating the tier allocation threshold 208. Since the counter value of the number of I/Os (a_count) and the weighted average calculation counter 1 value (c[1]_new)(Short-Range) become lower than the tier allocation threshold 208 in response to the load reduction on Saturday and Sunday (from after 24 hours to after 72 hours on the horizontal axis), demotion occurs. However, since the number of I/Os (a_result) for the relevant page by the method according to the present invention does not fall below the tier allocation threshold 208, the occurrence of demotion can be prevented.

A graph 2102 is a graph showing that promotion in a short cycle can be implemented. The calculation is based on the following indexes: $p[1]\_1=3$, $p[1]\_2=1$ (Short-Range), $p[2]\_1=127$, $p[2]\_2=1$ (Long-Range). The vertical axis represents the number of I/Os which is the load, and the horizontal axis represents the time course. Line 2108 is a graph indicating time changes of the actual number of I/Os for a page, that is, the counter value of the number of I/Os (a_count). Line 2109 is a graph indicating time changes of the weighted average calculation counter 1 value (c[1]_new) (Short-Range). Line 2110 is a graph indicating time changes of the weighted average calculation counter 2 value (c[2]_new) (Long-Range). Line 2111 is a graph showing time changes of the number of I/Os (a_result) for the relevant page by the method according to the present invention. Line 2112 is a line indicating the tier allocation threshold 208. When a high load (as indicated with line 2108) occurs, the weighted average calculation counter 2 value (c[2]_new) (Long-Range) is delayed in following the increase of the load and it is only after 24 hours when the weighted average calculation counter 2 value (c[2]_new) (Long-Range) exceeds the tier allocation threshold 208 and promotion is delayed significantly after the occurrence of the load increase. However, the number of I/Os (a_result) for the relevant page (line 2109) by the method according to the present invention can promptly follow the load increase and promotion can be implemented in a short cycle.

Furthermore, another possible method, other than the above-described methods, is to keep the measurement cycle as the short cycle and retain both frequency of the number of I/Os for the short cycle and the number of I/Os for the long cycle (several weeks or longer). When the measurement cycle is one hour, a possible method is to retain the number of I/Os in each measurement cycle for several weeks (several hundreds of pieces of data) as history data and calculate the number of I/Os in the long cycle by multiplying each measurement cycle by a constant weighted value, using the data (several hundreds of pieces of data) of the number of I/Os for each measurement cycle for several weeks. This method can be implemented when the number of monitoring target elements is small. However, the monitoring targets according to the present invention are on a page basis and the number of elements per system is enormous. In such a case, the capacity of storage areas required for calculation is enormous and an immense amount of time is required for its summarization processing. If the firstly-mentioned method of using the weighted average calculation counters is used, even if the number of I/Os is collected based on a particle size of a page, the calculation can be performed by using only several weighted average calculation counters without depending on the length of a cycle, the capacity of storage areas required for calculation can be reduced, and the time required for its summarization processing can also be reduced.

Another method other than the above-described methods is to have counters of the number of I/Os in a long cycle and a short cycle, respectively, and update the counters in each cycle. Since this method does not require to have a history of the number of I/Os for each measurement cycle in the long cycle as mentioned above, the capacity of storage areas required for calculation can be reduced. However, at the moment when each measurement cycle reaches a break point between the long cycles, the number of I/Os may sometimes change drastically and unbiased weight from the present back to the past cannot be obtained purely for each measurement cycle, so that demotion may be sometimes concentrated on the break point between the long cycles. If the firstly-mentioned method of using the weighted average calculation counters is used, unbiased weight from the present back to the past can be realized and the firstly-mentioned method can prevent the concentrated occurrence of demotion on a certain point in time better than the above-described method.

INDUSTRIAL APPLICABILITY

The present invention relates to an automatic tier management function of a storage system and can be applied to a computer system which can prevent demotion due to a temporary reduction of the number of I/Os and implement promotion with respect to an increase of the number of I/Os from a viewpoint of a short cycle, whose drives in a high-speed upper tier can process many I/Os, and which can solve bottlenecks in a lower tier, thereby enhancing the performance of the storage system.

REFERENCE SIGNS LIST

101 Host
102 Management server
103 Network
104 Storage system
105 External storage apparatus
106 Port
107 Maintenance I/F
108 Port
109 Processor package
110 Cache memory
111 Shared memory
112 Internal network
113 Drives
114 Drives
115 Tier 1
116 Tier 2
117 Tier 3
118 Local memory
119 Processor

The invention claimed is:

1. A storage system comprising:
a plurality of kinds of storage media, wherein a plurality of pools are configured from the plurality of kinds of storage media;
a processor configured to allocate a virtual storage area to a storage area of one storage medium from among the plurality of kinds of storage media; and
a memory configured to have monitoring information indicating a number of accesses to an allocated storage area, a first load index value of a first cycle for the allocated storage area, and a second load index value of a second cycle for the allocated storage area,
wherein the processor is configured to:
cyclically record the number of accesses to the allocated storage area in the memory;
update the first load index value of the first cycle for the allocated storage area, based on a first weighted average of the recorded number of accesses and the first load index value of the first cycle for the allocated storage area;
update the second load index value of the second cycle for the allocated storage area based on a second weighted average of the recorded number of accesses and the second load index value of the second cycle for the allocated storage area, a ratio of weights of the second weighted average being different from that of the first weighted average, the second cycle being longer than the first cycle;
receive a read command;
in response to receiving the read command, determine whether the read command is for data that exists in a cache memory, and:
on a condition that the read command is for data that does not exist in the cache memory, read the data from the storage media and update the monitoring information to increment the number of accesses to the allocated storage area, and
on a condition that the read command is for data that exists in the cache memory, do not update the monitoring information;
determine whether data exists in the cache memory that has not been written to the storage media, and:
on a condition that data exists in the cache memory that has not been written to the storage media, write the data from cache memory into the storage media and update the monitoring information to increment the number of accesses to the allocated storage area;
receive at least one setting for at least two monitor modes, the at least two monitor modes including at least a weighted mode and a non-weighted mode, wherein the at least one setting designates a particular pool of the plurality of pools;
on a condition that the received at least one setting is for the weighted mode, reallocate the virtual storage area to a storage area of a different kind of storage medium from among the plurality of kinds of storage media, based on a frequency distribution of the plurality of pools that is created based on a third load index value that is an average value or maximum value of the updated first load index value of the first cycle for the allocated storage area and the updated second load index value of the second cycle for the allocated storage area; and
on a condition that the received at least one setting is for the non-weighted mode, reallocate the virtual storage area to a storage area of a different type of storage medium, from among the plurality of kinds of storage media, based on the number of accesses instead of the third load index value.

2. The storage system according to claim 1, wherein the plurality of kinds of storage media are SSDs (Solid State Drivers), SAS (Serial Attached SCSI), and externally connected storage media.

3. The storage system according to claim 1, wherein the third load index value is an average value or a maximum value of values obtained by weighting the first load index value and the second load index value respectively.

4. The storage system according to claim 1, wherein if the third load index value exceeds or falls below a specified threshold, the processor reallocates the virtual storage area to a storage area of a different type of storage medium from among the plurality of kinds of storage media.

5. The storage system according to claim 1, wherein the processor sets a value input from a management device connected to the storage system as weight of the first weighted average and weight of the second weighted average.

6. A storage system comprising:
a plurality of kinds of storage media, wherein a plurality of pools are configured from the plurality of kinds of storage media;
a processor configured to allocate a virtual storage area to a storage area of one storage medium from among the plurality of kinds of storage media; and
a memory configured to have monitoring information indicating a number of accesses to an allocated storage area, a first load index value of a first cycle for the allocated storage area, and a second load index value of a second cycle for the allocated storage area, wherein the processor is configured to:

cyclically record the number of accesses to the allocated storage area in the memory;

update the first load index value of the first cycle for the allocated storage area based on a weighted average obtained by weighting the recorded number of accesses and the first load index value at a ratio of P1 to P2, where P1 is more than 0 and P2 is equal to or more than 0;

update the second load index value of the second cycle for the allocated storage area based on a weighted average obtained by weighting the recorded number of accesses and the second load index value of the second cycle for the allocated storage area, at a ratio of Q1 to Q2, where Q1 is more than 0 and Q2 is equal to or more than 0 and a relationship represented by the following is satisfied: (P2/P1)>(Q2/Q1), the second cycle being longer than the first cycle;

receive a read command;

in response to receiving the read command, determine whether the read command is for data that exists in a cache memory, and:

on a condition that the read command is for data that does not exist in the cache memory, read the data from the storage media and update the monitoring information to increment the number of accesses to the allocated storage area, and on a condition that the read command is for data that exists in the cache memory, do not update the monitoring information;

determine whether data exists in the cache memory that has not been written to the storage media, and:

on a condition that data exists in the cache memory that has not been written to the storage media, write the data from cache memory into the storage media and update the monitoring information to increment the number of accesses to the allocated storage area;

receive at least one setting for at least two monitor modes, the at least two monitor modes including at least a weighted mode and a non-weighted mode, wherein the at least one setting designates a particular pool of the plurality of pools;

on a condition that the received at least one setting is for the weighted mode, reallocate the virtual storage area to a storage area of a different kind of storage medium from among the plurality of kinds of storage media, based on a frequency distribution of the plurality of pools that is created based on a third load index value that is an average value or maximum value of the updated first load index value of the first cycle for the allocated storage area and the updated second load index value of the second cycle for the allocated storage area; and on a condition that the received at least one setting is for the non-weighted mode, reallocate the virtual storage area to a storage area of a different type of storage medium, from among the plurality of kinds of storage media, based on the number of accesses instead of the third load index value.

7. A storage area allocation method for a storage system comprising a plurality of kinds of storage media, a processor configured to allocate a virtual storage area to a storage area of one storage medium from among the plurality of kinds of storage media, wherein a plurality of pools are configured from the plurality of kinds of storage media, and a memory configured to have monitoring information indicating a number of accesses to an allocated storage area, a first load index value of a first cycle for the allocated storage area, and a second load index value of a second cycle for the allocated storage area, wherein the processor is configured for:

cyclically recording the number of accesses to the allocated storage area in the memory;

updating the first load index value of the first cycle for the allocated storage area based on a first weighted average of the recorded number of accesses and the first load index value of the first cycle for the allocated storage area;

updating the second load index value of the second cycle for the allocated storage area based on a second weighted average of the recorded number of accesses and the second load index value of the second cycle for the allocated storage area, a ratio of weights of the second weighted average being different from that of the first weighted average, the second cycle being longer than the first cycle;

receiving a read command;

in response to receiving the read command, determining whether the read command is for data that exists in a cache memory, and:

on a condition that the read command is for data that does not exist in the cache memory, reading the data from the storage media and updating the monitoring information to increment the number of accesses to the allocated storage area, and on a condition that the read command is for data that exists in the cache memory, not updating the monitoring information;

determining whether data exists in the cache memory that has not been written to the storage media, and:

on a condition that data exists in the cache memory that has not been written to the storage media, writing the data from cache memory into the storage media and updating the monitoring information to increment the number of accesses to the allocated storage area;

receiving at least one setting for at least two monitor modes, the at least two monitor modes including at least a weighted mode and a non-weighted mode, wherein the at least one setting designates a particular pool of the plurality of pools;

on a condition that the received at least one setting is for the weighted mode, reallocating the virtual storage area to a storage area of a different kind of storage medium from among the plurality of kinds of storage media, based on a frequency distribution of the plurality of pools that is created based on a third load index value that is an average value or maximum value of the updated first load index value of the first cycle for the allocated storage area and the updated second load index value of the second cycle for the allocated storage area; and on a condition that the received at least one setting is for the non-weighted mode, reallocating the virtual storage area to a storage area of a different type of storage medium, from among the plurality of kinds of storage media, based on the number of accesses instead of the third load index value.

8. The storage area allocation method according to claim 7, wherein the plurality of kinds of storage media are SSDs (Solid State Drivers), SAS (Serial Attached SCSI), and externally connected storage media.

9. The storage area allocation method according to claim 7, wherein the third load index value is an average value or a maximum value of values obtained by weighting the first load index value and the second load index value respectively.

10. The storage area allocation method according to claim 7, wherein if the third load index value exceeding or falling below a specified threshold, the processor reallocates the virtual storage area to a storage area of a different type of storage medium from among the plurality of kinds of storage media.

11. The storage area allocation method according to claim 7, wherein the processor setting a value input from a management device connected to the storage system as weight of the first weighted average and weight of the second weighted average.

\* \* \* \* \*